United States Patent
Mowafy et al.

[11] Patent Number: 5,995,611
[45] Date of Patent: Nov. 30, 1999

[54] METHODS AND APPARATUS FOR MANAGING AN IN-BAND DATA TRANSMISSION VIA A COMMUNICATIONS LINK SHARED BY MULTIPLE TERMINALS

[75] Inventors: Hala E. Mowafy; Stanley Pietrowicz, both of Eatontown; Frederick C. Link, Red Bank, all of N.J.

[73] Assignee: Telcordia Technologies, Inc., Morristown, N.J.

[21] Appl. No.: 08/999,843

[22] Filed: Feb. 14, 1997

Related U.S. Application Data

[60] Provisional application No. 60/011,625, Feb. 14, 1996.

[51] Int. Cl.$^6$ .................................................. H04M 7/00
[52] U.S. Cl. ...................... 379/215; 379/142; 379/93.11; 379/88.19
[58] Field of Search ..................................... 379/142, 215, 379/88.17, 88.19, 88.2, 88.21, 93.01, 93.09, 93.11, 93.14; 370/352–356, 230, 463, 420

[56] References Cited

U.S. PATENT DOCUMENTS

| | | | |
|---|---|---|---|
| 5,263,084 | 11/1993 | Chaput | 379/215 |
| 5,583,924 | 12/1996 | Lewis | 379/142 |
| 5,857,017 | 1/1999 | Ohi et al. | 379/201 X |

OTHER PUBLICATIONS

LSSGR LATA Switching Systems Generic Requirements, CLASS$^{SM}$ Feature: Calling Identity Delivery on Call Waiting, Bellcore Technical Reference TR–NWT–000575, Issue 1, Oct. 1992.

CLASS$^{SM}$ Feature: Calling Identity Delivery on Call Waiting FSD 01–02–1090, Bellcore Technical Reference TR–NWT–000575, Issue 1, Oct. 1992, Revision 1, Dec. 1994.

Classes of Customer Premises Equipment, Bellcore Special Report 002726, Issue 1, Aug. 1993.

LSSGR: Voiceband Data Transmission Interface Section 6.6, Bellcore Requirements GR–30 CORE Issue 1, Dec. 1994.

*Primary Examiner*—Creighton Smith
*Attorney, Agent, or Firm*—David A. Hey

[57] ABSTRACT

A method which, in response to an alerting signal from a source, manages a data transfer from the source, via a communications link, to at least two terminals coupled with the communications link. The method (a) dynamically designates one of the at least two terminals as a token terminal, (b) generates an acknowledgment signal with the token terminal, and (c) terminates the communications link during the data transfer with the token terminal. The dynamic designation of the token terminal is performed by (a) assigning a time delay for each of the terminals, and (b) determining, with each of the terminals, after the assigned time delay, whether the terminal will accept the data transfer from the source based on a condition of the communications link.

42 Claims, 17 Drawing Sheets

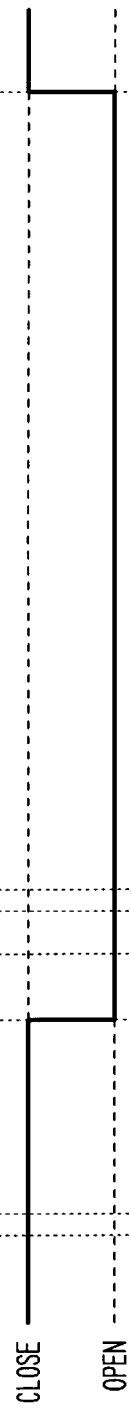
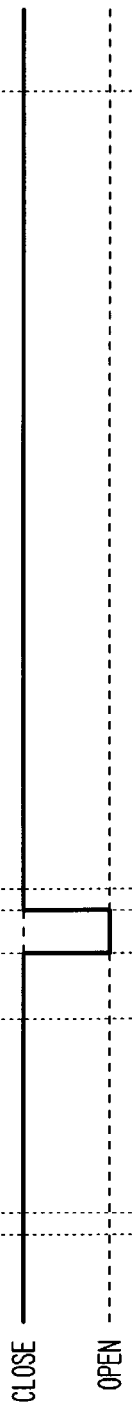
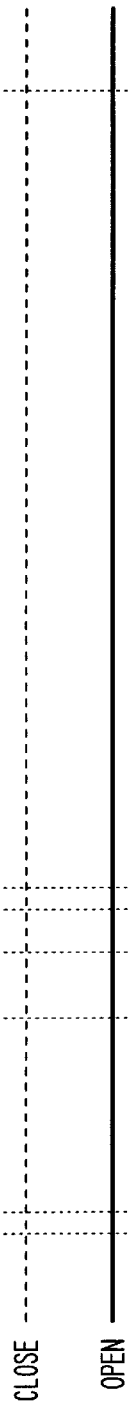
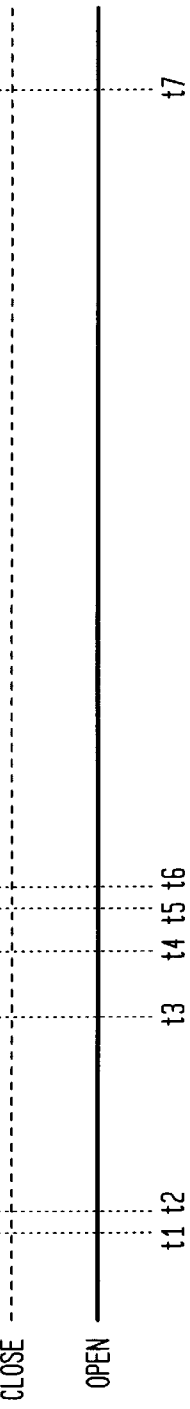

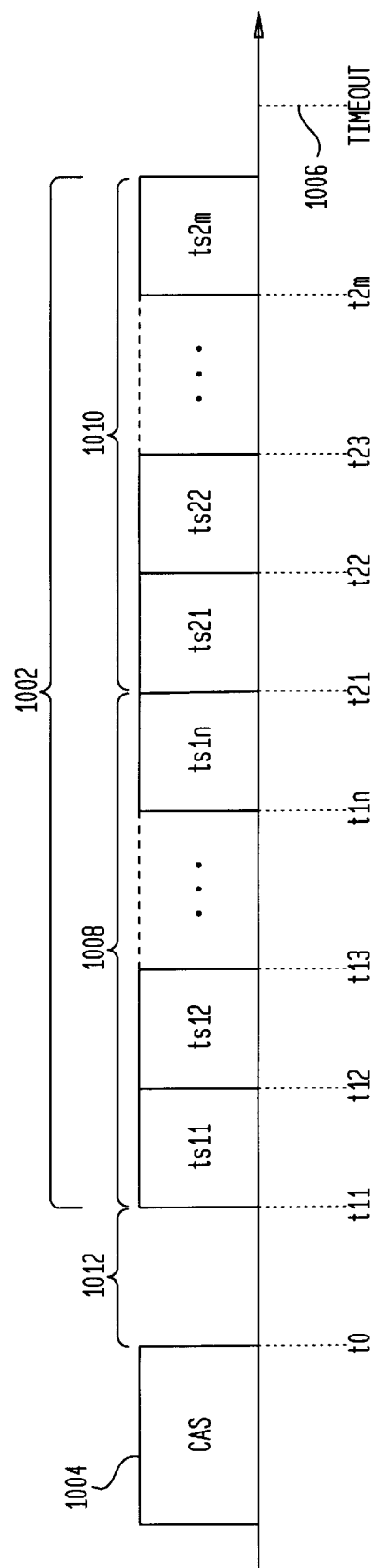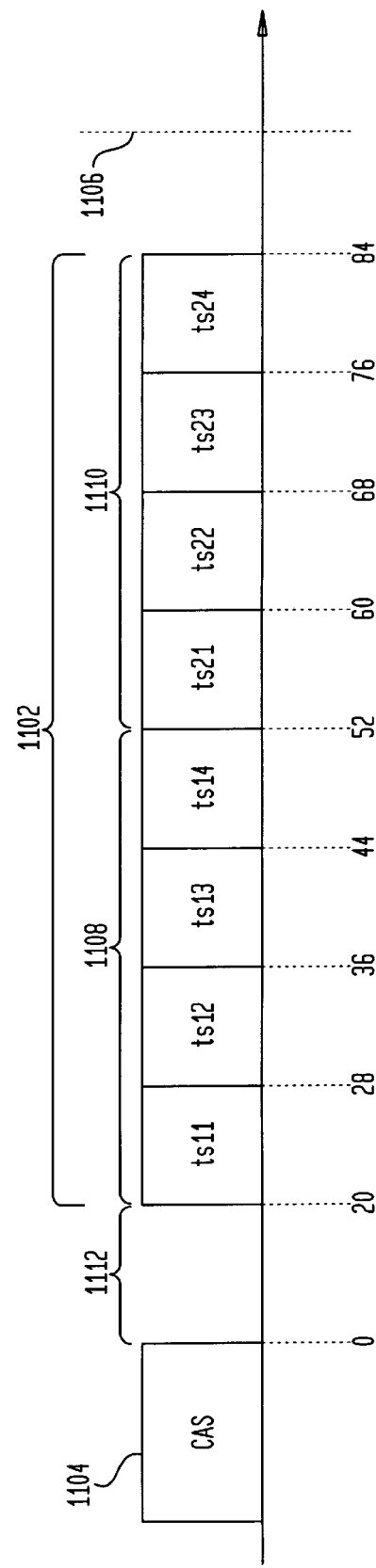

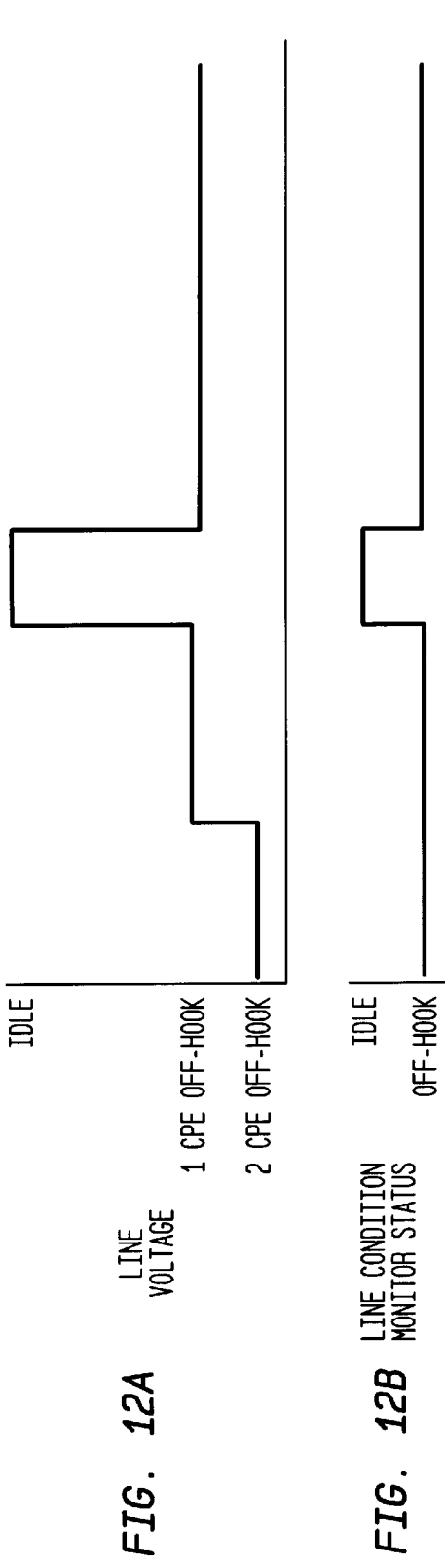
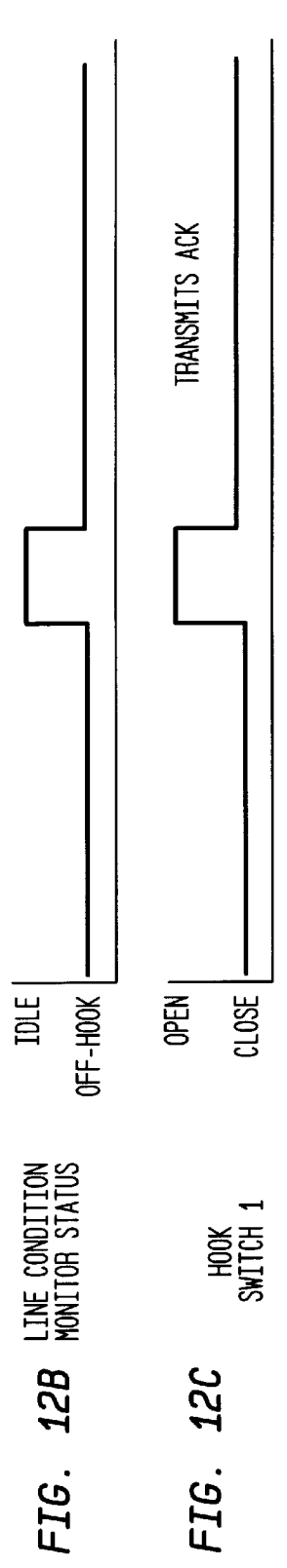
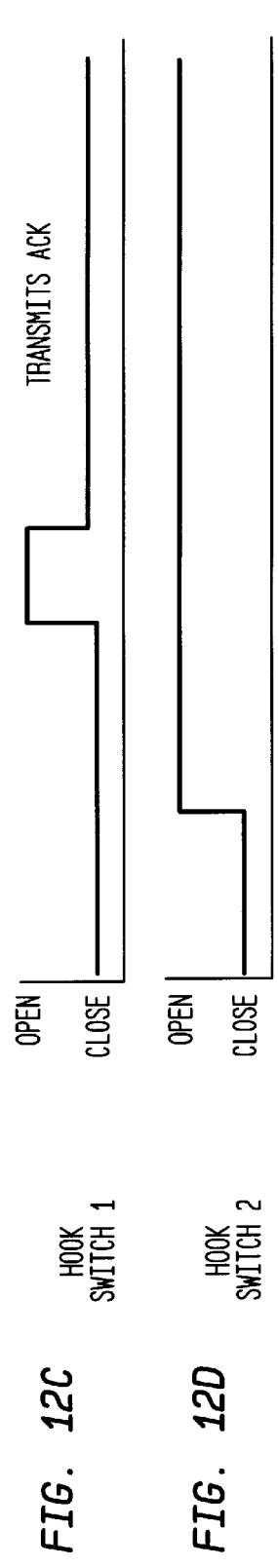
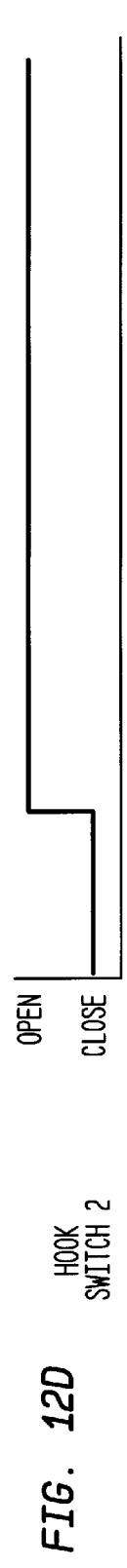
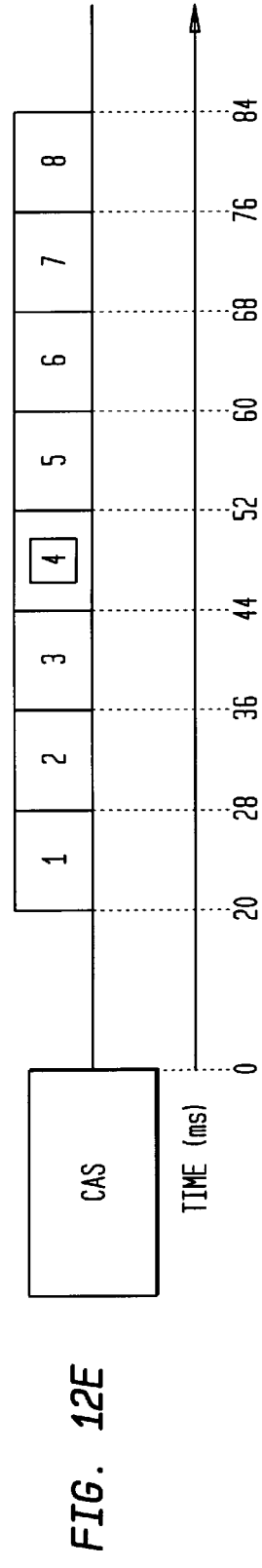
FIG. 12A LINE VOLTAGE
FIG. 12B LINE CONDITION MONITOR STATUS
FIG. 12C HOOK SWITCH 1
FIG. 12D HOOK SWITCH 2
FIG. 12E

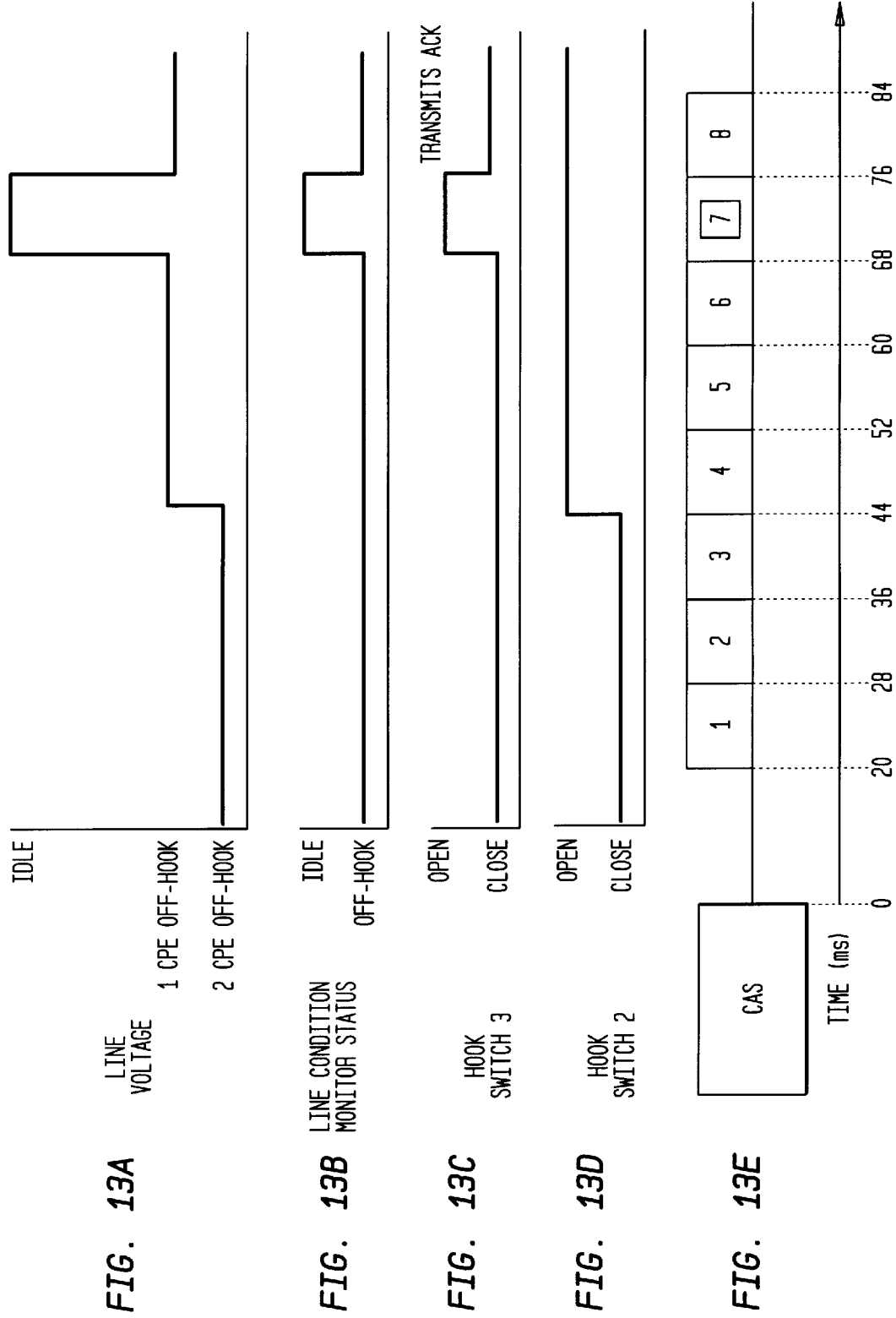

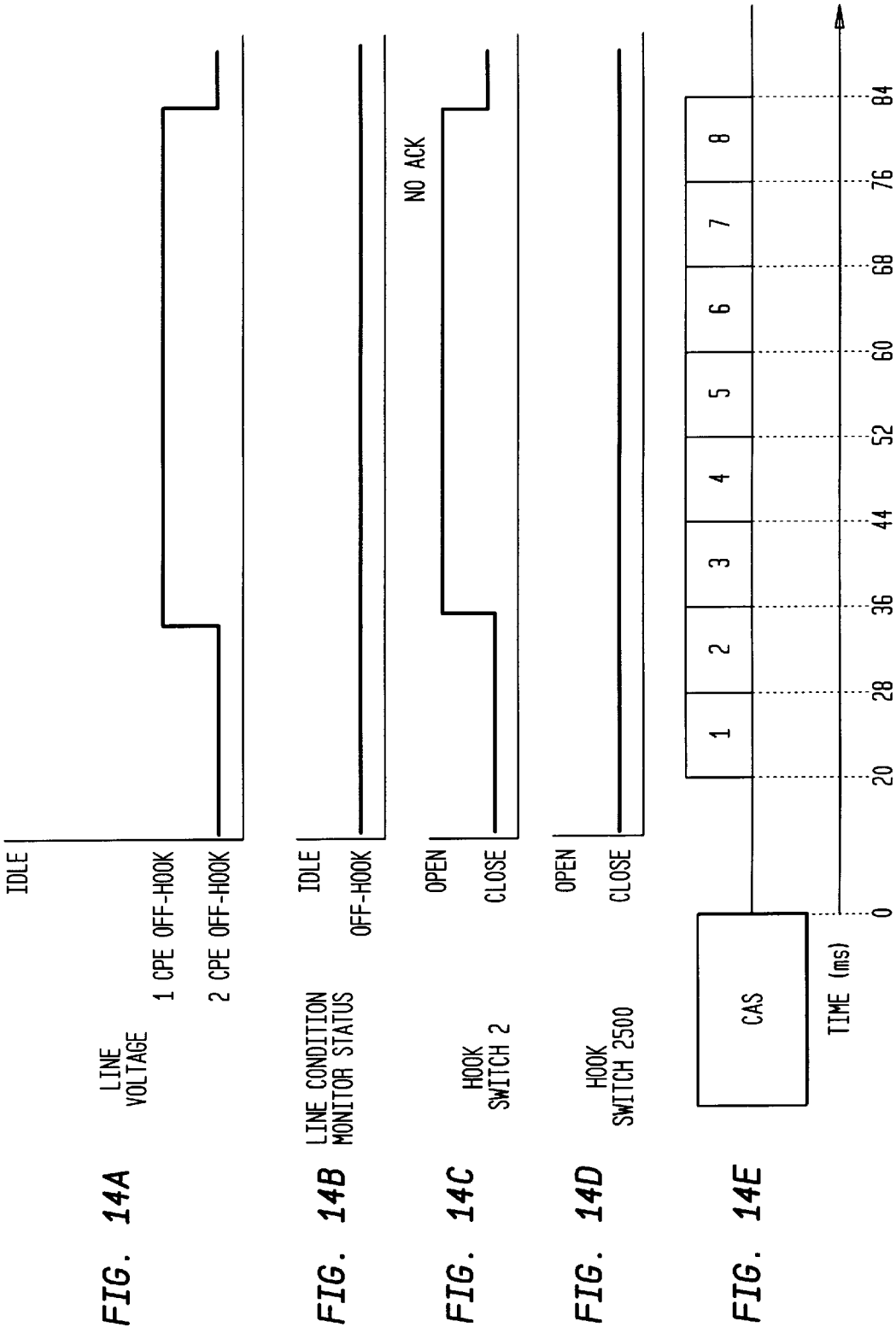

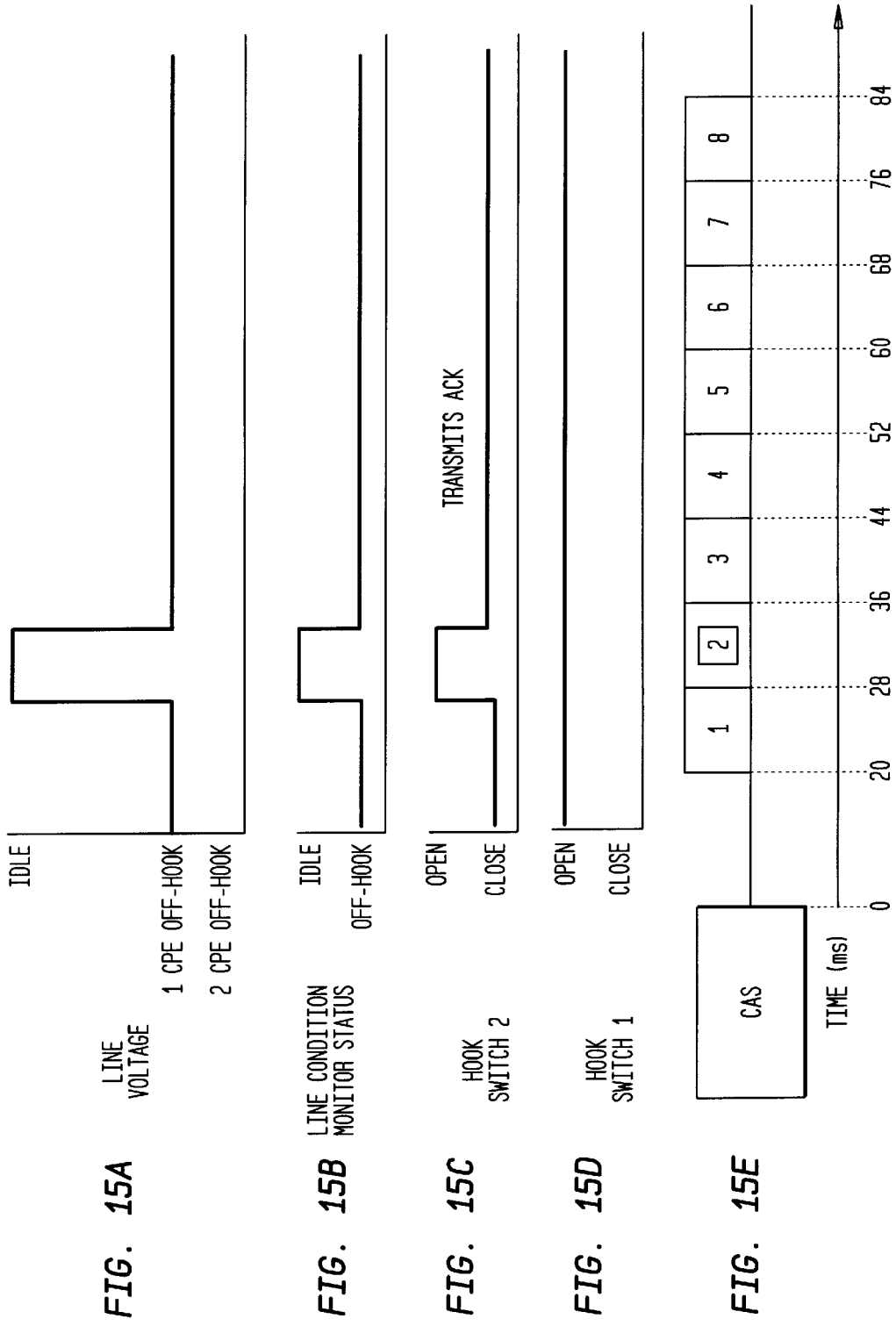

METHODS AND APPARATUS FOR MANAGING AN IN-BAND DATA TRANSMISSION VIA A COMMUNICATIONS LINK SHARED BY MULTIPLE TERMINALS

CLAIM TO PRIORITY

Benefit is claimed, under 35 U.S.C. § 119(e)(1), to the filing date of provisional patent application serial number 60/011,625, filed on Feb. 14, 1996, and listing Hala E. Mowafy as the inventor, for any inventions disclosed in the manner provided by 35 U.S.C. § 112, ¶1.

BACKGROUND OF THE INVENTION a. Field of the Invention

The present invention concerns in-band signaling in a voice communications network and, in particular, concerns handshaking between customer premises equipment (CPE) and a switching system to facilitate the communication of in-band data, such as caller identity information for example.

b. Related Art

§ 1.1 Caller ID

Many regional bell operating companies ("RBOCs") and other telephone service providers (collectively referred to as "TELCOs") have provided enhanced telephone services. One such enhanced service is Calling Number Delivery ("CND"). Basically, when a customer having Calling Number Delivery service and compatible equipment receives signals (e.g., ringing patterns) indicating an incoming call, the TELCO will transmit data which identifies the party calling between the ringing pattern signals. While the customer's equipment is on-hook, the information regarding the identity of the calling party is provided (e.g., via LCD display) to the customer. Thus, the customer can decide whether or not to answer the call based on the identity of the calling party. The physical layer, data link layer, and message assembly layer requirements of the Calling Number Delivery data are known to those skilled in the art and described in the Bellcore Generic Requirements entitled, *LSSGR: Voiceband Data Transmission Interface Section 6.6*, GR-30-CORE, Issue 1 (December 1994) (hereinafter referred to as "GR-30-CORE" and incorporated herein by reference). In general, if the customer's line goes off-hook during data transmission, the data transmission is pre-empted or stopped and normal call completion treatment is executed.

§1.1.1 CID On-Hook Data Transmission Protocol

As discussed briefly above, when a CID compliant CPE is on-hook, data identifying the caller is transmitted between the first and second power ringing patterns. For example, as shown in the known method of FIG. 1A, data may be transmitted during a time 104 starting 0.5 to 1.5 seconds ($t_1$) after a first ringing pattern 102 and ending at least 200 ms ($t_2$) before a second ringing pattern 106. If power ringing patterns are not provided, the data may be transmitted after an Open Switching Interval ("OSI") and a silent interval. For example, as shown in the known method of FIG. 1B, a time period for data transmission 154 follows a 150 to 350 ms OSI 152, and a 300 ms silent period $t_3$. In general, if the line goes off-hook during data transmission, the data transmission is pre-empted or stopped and normal call completion treatment is executed.

§1.2 Caller Identity Delivery on Call Waiting

§1.2.1 Purpose of CIDCW

Most TELCOs offer enhanced caller ID services such as Calling Identity Delivery on Call Waiting ("CIDCW") for example. If a customer has Calling Identity Delivery on Call Waiting service and compatible equipment, when they are off-hook and connected with a second party ("the far-end party") and a third party ("the waited party") calls the customer, following a handshaking protocol, the customer is alerted to the fact that the third party is waiting and is provided (e.g., via LCD display) with information regarding the identity of the waiting third party. Thus, the customer may chose to ignore the waited third party, or put the far-end second party on hold and establish a connection with the waited third party, etc. based on the provided identity information.

§1.2.2 Devices for Facilitating CIDCW

As mentioned above, TELCOs offer different services to their customers. However, to use such services or to fully exploit such services, the customers need compliant equipment at their premises. Although different types and classes of customer premises equipment ("CPE") are known to those skilled in the art and described in the Bellcore Special Report entitled, *Classes of Customer Premises Equipment*, SR-INS-002726, Issue 1 (August 1993) (hereinafter referred to as "SR-INS-002726" and incorporated herein by reference), relevant classes of Customer Premises Equipment will be described below for the reader's convenience.

Type 1 Customer Premises Equipment can receive and interpret on-hook data transmissions which use the single data message format ("SDMF") and the multiple data message format ("MDMF") and supports Calling Number Delivery, Calling Name Delivery, and Visual Message Waiting Indicator services. (SDMF and MDMF are defined in GR-30-CORE.) In addition to supporting the services supported by Type 1 CPE, Type 2 Customer Premises Equipment can receive and interpret off-hook data transmissions which use the multiple data message format ("MDMF"). Thus, Type 2 CPE can further support Calling Identity Delivery on Call Waiting services. Finally, in addition to supported the services supported by Type 1 and Type 2 CPE, Type 3 CPE conform with the Analog Display Service Interface ("ADSI") and protocol and further supports ADSI Server Display Control and Feature Download services, as well as ADSI-based Visual Features services such as Visual Screening List Editing, Call Waiting Deluxe, and Visual access to information services such as directory, home banking, etc.

§1.2.3 Basic Operation of CIDCW

As discussed above, both Type 2 and Type 3 CPEs support Caller Identity Delivery on Call Waiting (CIDCW) service. Although the data transmission protocol for the CIDCW service is known to those skilled in the art and described in GR-30-CORE, a high level description of the data transmission protocol is provided below for the reader's convenience.

As discussed above, customers having CID (or CIDCW) service and compatible equipment can receive information identifying a waited party while that customer is off-hook. For example, as shown in FIG. 2, a third party (waited party) 212 may call an off-hook first party (CIDCW customer) 204 having an established connection 206, 220, 208, via a central office switch 202, with a second party (far-end party) 210. The central office switch 202 (e.g., a stored program controlled switching system or "SPCS") should alert the CIDCW customer 204 that a call is waiting and should inform the CIDCW customer 204 of the identity of the waited party 212. Although the process for alerting and informing the CIDCW customer 204 is known to those skilled in the art and described in GR-30-Core, it is explained below with reference to FIGS. 3, 4A, and 4B for the reader's convenience.

FIGS. 4A and 4B are timing diagrams which represent signaling from a central office switch 202 (e.g., an SPCS) to a CIDCW party 204. FIG. 3 illustrates the CAS-ACK handshake and call waiting data transmission between the central office switch 202 and the CIDCW party 204. The timing diagrams are not necessarily to scale.

FIG. 4A is a timing diagram of a successful attempt by the central office switch to transmit caller identification data to the CIDCW party 204. First, as shown in time period 402, the central office switch 202 may create an open switching interval (OSI) during which the DC voltage between the tip and ring of a line is removed, thereby temporarily suspending line supervision and transmission. This time period 402 is optional and preferably lasts between 0 and 300 ms. Next, as shown in time period 404, the central office switch 202 mutes the far end party 210 before generating an alerting sequence on the line. Next, as shown in time period 406 and in FIG. 3, the central office switch 202 places a subscriber alerting signal ("TSAS") onto the line. The SAS is an audible signal which alerts the CIDCW party 204 that a caller is waiting. The SAS preferably occurs within a 250 ms to 1 second window 406. After a transition time 408 of, for example, 0 to 50 ms, the central office switch 202 provides a CPE alerting signal (CAS) to the CIDCW party 204, as shown in time period 410 and FIG. 3. The time window 410 is preferably between 80 and 85 ms.

During an acknowledgment time-out period 412, the central office switch 202 waits for an acknowledgment signal (ACK) from the CIDCW party 204. The time-out period 412 is preferably between 155 ms and 165 ms. The timing diagram of FIG. 4A illustrates the time periods following the receipt of an acknowledgment signal from the CIDCW party 204 during the time-out period 412 (i.e., a successful handshake). After an optional transition period 414 of, for example, 50 ms to 500 ms, the central office provides the caller identity data (encoded in frequency shift keying ("FSK")) to the CIDCW party 204 during time period 416. After an optional OSI time period 418 and an optional delay to voice path period 420, the voice path between the CIDCW party 204 and the far-end party 210 is restored. That is, the central office switch 202 un-mutes the far-end party. As shown in the timing diagram of FIG. 4B if an acknowledgment signal from the CIDCW party 204 is not received during the time-out period 412 (i.e., an unsuccessful handshake), then, after an optional OSI time period 418 and an optional delay to voice path period 420, the voice path between the CIDCW party 204 and the far-end party 210 is restored.

§1.3 Problems and/or Constraints with CIDCW

Problems may arise when, as shown in FIG. 5, multiple extensions (referred to as pieces of customer premises equipment or "CPEs") 502 share a CIDCW party's 204 line 206. More specifically, caller identity data, encoded as FSK data, is "in-band" data. That is, the FSK data is within the voice band of the connection 206, 220, 208. If a single Type 2 or Type 3 CPE is provided on the line 206, then the CPE will mute its transmit (talk) and receive (listen) paths so that the user of the CPE does not hear annoying FSK in-band data transmissions and so that the speech of the user of the CPE does not interface with FSK detection. However, if the line 206 is provided with more than one CPE 502, then the CAS-ACK handshake and the FSK data transmission becomes much more complicated.

If a Type 1 CPE is off-hook when a CAS is received, an acknowledgment signal ACK is not sent because Type 1 CPEs are not intelligent enough to mute their transmit and receive paths in response to a CAS. Moreover, if more than one Type 2 or Type 3 CPEs are concurrently off-hook when a CAS is received, only one of the CPEs should provide an acknowledgment ACK signal. Otherwise, the multiple acknowledgment signals ACK may distort the acknowledgment handshake to such an extent that detection of the acknowledgment signal ACK by the central office switch 202 is precluded. In such instances, the central office switch 202 will not provide the caller identity data. Finally, Type 2 and Type 3 CPEs transmit different acknowledgment signals ACK in response to a detected CAS. Since the functionality of Type 3 CPEs supersedes that of Type 2 CPEs, if both a Type 2 and a Type 3 CPE are concurrently off-hook when a CAS is received, only the Type 3 CPE should respond with an acknowledgment signal ACK.

§1.4 Flash Signals

After a successful CAS-ACK handshake and an FSK caller identity data transmission, the voice path is reestablished as described above with reference to FIG. 4A. A CPE 502 may provide a flash signal (i.e., an on-hook line condition for a predetermined period of time) to the central office switch 202 to activate a feature specific option. Basically, a flash signal causes the central office switch 202 to place the current far end party 210 on hold and connects the waited party 212 to the CIDCW party 204. A subsequent flash signal causes the central office switch 202 to connect the held party 210 to the CIDCW party 204 and to place the originally waited party 212 on hold.

§1.4.1 Constraints with Flash Signaling

When a line 206 is provided with multiple CPEs 502, all off-hook CPEs, except one, must return to the on-hook condition so that the one CPE can generate a flash hook signal on the line.

§1.5 Related Patents and Their Problems and/or Limitations

U.S. Pat. No. 5,263,084 ("the Chaput et al patent") discusses a CIDCW system in which an acknowledgment signal is not provided if any extensions of a CIDCW party are off-hook. However, the Chaput et al patent does not describe a system which considers whether the CIDCW compliant CPEs are of different types (e.g., Type 2 and Type 3) and does not specify how an off-hook condition is determined. Moreover, the system discussed in the Chaput et al patent apparently will not provide an acknowledgment signal if any extension is off-hook. Furthermore, the Chaput et al patent does not address and describe flash signaling when multiple extensions are off-hook.

U.S. Pat. No. 5,583,924 ("the Lewis patent") discusses a system in which multiple conforming CPEs ("CCPEs") (e.g., Type 2 or Type 3 CPEs) share a single line. In response to a CAS signal, each of the CCPEs goes on-hook. A primary CPE then goes off-hook and transmits an acknowledgment signal to the central office. After the caller identity data is received by the CCPEs, the CCPEs go off-hook, the primary CCPE goes on hook, and all CCPEs display the caller identity information. If any non-conforming CPEs ("NCPEs") (e.g., Type 1 CPEs) are off-hook, the primary CCPE does not go off-hook to transmit the acknowledgment signal. Unfortunately, in the system discussed in the Lewis patent, the primary CCPE is apparently predetermined. Thus, any added CCPEs may not be designated as a primary CCPE. Furthermore, if the primary CCPE fails, the system will not work. Finally, the system discussed in the Lewis patent apparently does not distinguish between different types of CCPEs (e.g., Type 2, Type 3, etc.).

SUMMARY OF THE INVENTION

In view of the above, improved methods and apparatus for providing caller identity on call waiting are needed. Such methods and apparatus should preferably: (i) permit CIDCW data transmission, without regard for the number of CIDCW compliant CPEs off-hook, if only CIDCW compliant CPEs are off-hook; (ii) prevent CIDCW data transmission if any non-compliant CPEs are off-hook; (iii) permit different types of CPEs to share the same line; (iv) only permit one CIDCW compliant CPE to acknowledge a CAS; (v) only permit the CIDCW CPE supporting the most advanced functionality to acknowledge a CAS; (vi) synchronize all CPE call logs; (vii) be insensitive to open switching intervals (OSIs), voltage difference due to loop length variations, and changes in a CPE's DC resistance; (viii) not place the line into conditions which may be mistakenly interpreted as dial pulse signals or flash signals by the central office switch; (ix) permit flash signal generation when more than one CIDCW compliant CPEs is off-hook; (x) not require customer programming or setting; and (xi) permit only one CPE to terminate the line during identity data transmission.

The present invention meets one or more of the above-listed needs by providing a method for managing, in response to an alerting signal from a source, a data transfer from the source via a communications link, to at least two terminals coupled with the communications link. The method (a) assigns a time delay for each of the terminals, and (b) determines, with each of the terminals, after the assigned time delay, whether the terminal will accept the data transfer from the source based on a condition of the communications link.

The terminals are preferably caller identity delivery on call waiting compliant terminals. In this case, the step of assigning a delay time for each of the caller identity delivery on call waiting compliant terminals may include a sub-step of storing the delay time in a memory means of the terminal. Alternatively, the step of assigning a delay time for each of the caller identity delivery on call waiting compliant terminals may performed (a)randomly, upon power-up of the terminal, (b) randomly, upon off-hook condition of the terminal, (c) randomly, upon detection of the alerting signal by the terminal, or (d) based on a user switch selection.

The data transfer from the source may include caller identity data of a waited party. The communications link preferably carries voice data between the terminals and the source, and the data transfer preferably includes in-band data. Moreover, the communications link preferably can have an on-hook condition and an off-hook condition. In such a case, in the step of determining whether the terminal will accept the data transfer from the source based on a condition of the communications link, the terminal first goes on-hook. If the communications link transitions to an on-hook condition when the terminal goes on-hook, the terminal (a) goes off-hook, (b) generates an acknowledgment signal, and (c) terminates the communications link during the data transfer. If, on the other hand, the communications link remains in an off-hook condition when the terminal goes on-hook, the terminal (a) remains on-hook for a predetermined time period, and (b) returns to a hook state matching its hook state before the alerting signal after the predetermined time period. The step of determining the state of the communications link may be performed by a line condition monitor of the terminal. The terminal may further monitor the condition of the line while it is on-hook. If the terminal determines that the line condition goes back on-hook, the predetermined time period corresponds to a time for the data transmission to end. If, on the other hand, the terminal does not determine that the line condition goes back on-hook, then the predetermined time period corresponds to an acknowledgment time-out period.

It is possible that each of the terminals may belong to one of two different classes of terminals. In such a case, the step of assigning a delay time for each of the terminals includes sub-steps of (i) defining a first group of time delays for a first class of terminals, (ii) defining a second group of time delays for a second class of terminals, and (iii) identifying a first one of the terminals to go off-hook. The first group of time delays includes a last time delay and the second group of time delays includes a last time delay. If the first off-hook terminal belongs to the first class of terminals, it is assigned the last time delay of the first group of time delays. If, on the other hand, the first off-hook terminal belongs to the second class of terminals, it is assigned the last time delay of the second group of the time delays. If any terminals belonging to the first class of terminals go off-hook after the first off-hook terminal, they are assigned to random ones of time delays, other than the last time delay, of the first group of time delays. Further, if any terminals belonging to the second class of terminals go off-hook after the first off-hook terminal, they are assigned to random ones of time delays, other than the last time delay, of the second group of time delays.

If the second class of terminals supports more functions than the first class of terminals, then each of the time delays of the second group of time delays are larger than each of the time delays of the first group of time delays.

The sub-step of identifying the first off-hook terminal may be performed based on information from a line current sensor of a peripheral to the terminal, or by a controller of the terminal, a hook switch of the terminal, and a line condition monitor of the terminal.

In response to an alerting signal from a source, the present invention provides a method for managing a data transfer from the source, via a communications link, to at least two terminals coupled with the communications link. The method includes steps of (a) dynamically designating one of the terminals as a token terminal, (b) generating an acknowledgment signal with the token terminal, and (c) terminating the communications link during the data transfer with the token terminal. The step of dynamically designating one of the terminals as a token terminal preferably includes sub-steps of (i) assigning a delay time for each of the at least two terminals, and (ii) determining, with each of the terminals, after the assigned time delay, whether the terminal will accept the data transfer from the source based on a condition of the communications link.

Preferably, in the method of the present invention, in each of the terminals, a transmit path and/or a receive path is muted.

If the communications link carries voice data between the terminals and the source, if the data transfer includes in-band data, and if at least some of the terminals are configured to interpret the data transmission, then each of the terminals configured to interpret the data transmission will preferably process the data transmission without regard to their hook state.

The methods of the present invention may further determine a synchronizing reference time from which the time delay of each of the terminals is measured. If the communications link can have an on-hook condition and an off-hook condition, then the step of determining the synchronizing reference time is preferably performed in each of the terminals and includes sub-steps of (i) determining an end of the alerting signal, (ii) waiting for a first predetermined time period, (iii) going-on hook, and (iv) determining the synchronizing reference time to be when the condition of the communications link transitions to the on-hook condition. The step of determining the synchronizing reference time may include further sub-steps of (v) waiting for a second predetermined period of time, and (vi) going off-hook.

In a telecommunications system having at least two terminals coupled with a communications link, the present invention further provides a method for generating a flash signal on the communications link in response to a flash signal request by one of the at least two terminals. The method includes steps of (a) altering, with the requesting terminal, a condition of the communications link to a recognizable condition distinguishable from both an on-hook condition and an off-hook condition, (b) detecting, by each of the terminals, the recognizable condition of the communications link, (c) validating, by each of the terminals, the recognizable condition of the communications link, and (d) after a first predetermined time, generating, by each of the terminals, a flash signal.

If the communications link includes a tip line and a ring line, then the step of altering the condition of the communications link to a recognizable condition includes a sub-step of coupling, by the requesting terminal, a DC shunt across the tip and ring lines of the communications link. The coupling the DC shunt across the tip and ring lines of the communications link is preferably done repeatedly to form a cadence of pulses on the communications link. The step of validating, by each of the terminals, the recognizable condition of the line preferably includes a sub-step of determining whether the time of the recognizable condition of the communications link is longer than a second predetermined time and shorter than a third predetermined time.

The present invention also provides a system including means for performing each of the above method steps.

BRIEF DESCRIPTION OF THE DRAWINGS

FIG. 8 is a timing diagram which illustrates one example of the operation of the process of FIG. 7.

FIG. 10 is a timing diagram which illustrates certain steps of the process of FIG. 9.

FIG. 11 is a timing diagram of a preferred embodiment of the method of FIG. 9.

FIGS. 12A through 12E are a timing diagrams which illustrate the operation of the process of FIG. 9 under a first scenario.

FIGS. 13A through 13E are a timing diagrams which illustrate the operation of the process of FIG. 9 under a second scenario.

FIGS. 14A through 14E are timing diagrams which illustrate the operation of the process of FIG. 9 under a third scenario.

FIGS. 15A through 15E are timing diagrams which illustrate the operation of the process of FIG. 9 under a fourth scenario.

DETAILED DESCRIPTION

Figure 1A:
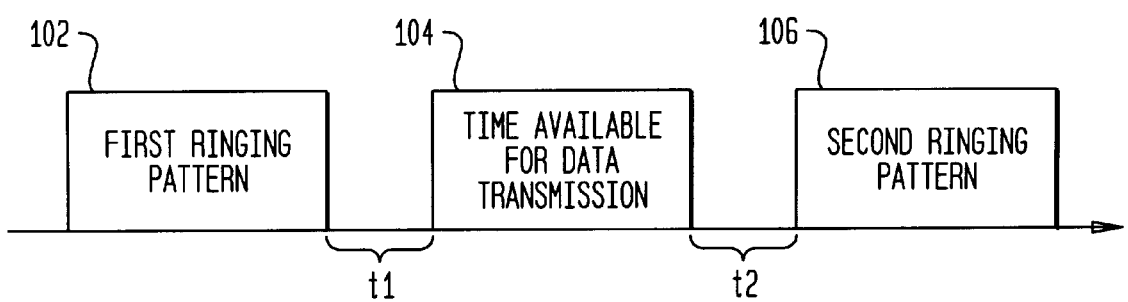
FIGS. 1A and 1B are timing diagrams which illustrate known ways of transmitting caller identity data to an on-hook customer premises equipment.
Figure 1B:
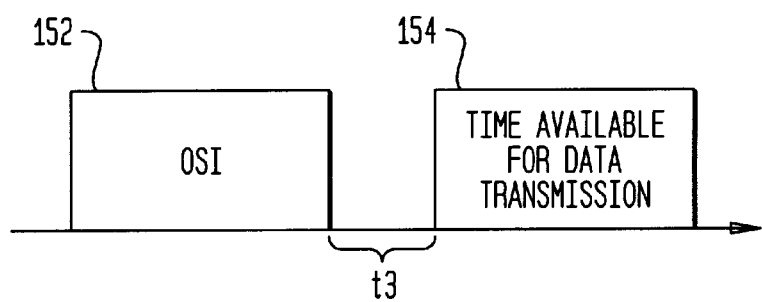
Figure 2:
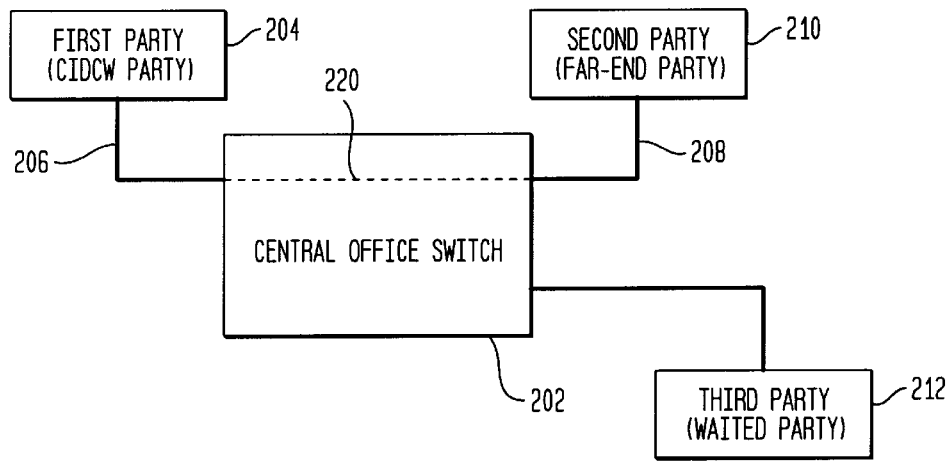
FIG. 2 is a block diagram of a CIDCW party connected with a far-end party and a waited party which is attempting to connect with the CIDCW party.
Figure 3:
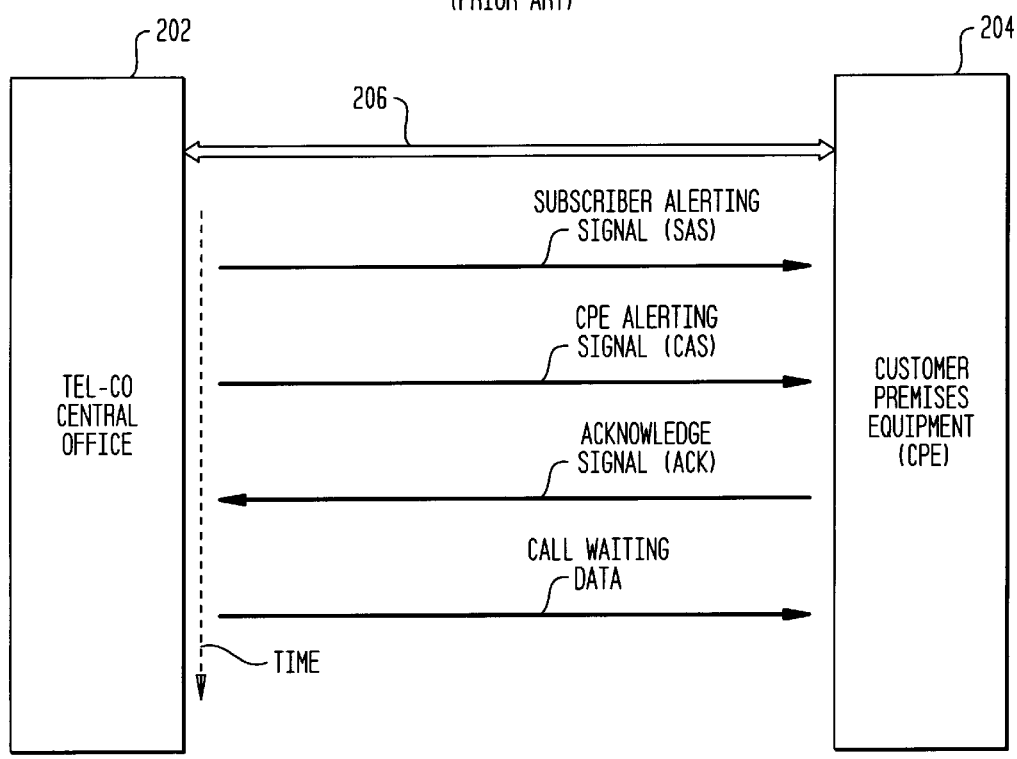
FIG. 3 is a block diagram which illustrates handshaking and caller identity transmission between a central office and a CIDCW compliant customer premises equipment.

The present invention concerns novel methods and apparatus for facilitating in-band handshaking and signaling, such as in the context of in-band caller identity information. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiment shown.

§2.0 Abbreviations and Definitions

The following definitions are provided to help the reader understand the preferred embodiments of the present invention and are not intended to limit the claimed invention.

| | |
|---|---|
| ACK | An Acknowledgmnt signal send by a CPE to an SPCS to signal that it is prepared to receive off-hook data transmissions. |
| Adjunct | A peripheral unit to a line terminating device such as a telephone. An example of an adjunct is a caller ID unit coupled with an ordinary telephone. |
| ADSI | Analog Display Service Interface. ADSI is described in Bellcore TR-NWT-001273. |
| Alerting Sequence | The SAS, followed by the CAS. The SPCS sends the alerting sequence over a CIDCW customer's line to alert the customer to a waited call and to alert a CPE to a forthcoming off-hook data transmission. |
| CAS | CPE Alerting Signal: a dual tone signal (e.g., 2130 HZ and 2750 Hz) appended to the Subscriber Alerting Signal (SAS) and sent be an SPCS to alert a CPE to forthcoming off-hook data transmission. |

-continued

| | |
|---|---|
| CID Data | Calling Identity Delivery data: information regarding an incoming call delivered to a customer. |
| CID Feature | Calling Identity Delivery Feature: a service, such as Calling Number Delivery or Calling Name Delivery, that delivers information about a waited party to a called customer. |
| CIDCW | Caller Identity Delivery on Call Waiting |
| CIDCW Compliant CPE | Customer premises equipment that supports CIDCW function. For example, Type 2 and Type 3 CPEs support CIDCW service while Type 1 CPEs do not. |
| CIDCW Customer | A customer having the CIDCW feature enabled on their line. |
| CPE | Customer Premises Equipment. |
| CW | Call Waiting feature |
| DN | Directory Number |
| Far-End Party | A party with whom a CIDCW customer has a current talking connection. |
| FSK | Fequency Shift Keying |
| Held Party | A party that has been put into a held state, i.e., a connection with a silent termination, by a CIDCW customer, which the customer is engaged in a talking connection with another party. |
| MEFC | Multiple Extension Flash Capability |
| MEI | Multiple Extension Internetworking |
| MEO | Multiple Extension Operation |
| Off-Hook | Refers to when a CPE is active. If multiple CPEs share a line, any off-hook CPE will cause the line to be in an off-hook condition. |
| On-Hook | Refers to when a CPE is idle. If multiple CPEs share a line, the line will be in an on-hook condition only if all of the CPEs are on-hook. |
| OSI | Open Switching Interval: signals loop transmission equipment that an on-hook transmission path is needed. |
| SAS | Subscriber Alerting Signal: an audible tone (e.g., 440 Hz.) provided to alert a customer to a waited call. |
| SPCS | Stored Program Controlled switching System |
| Token CPE | CPE responsible for responding to a CAS with an ACK signal. |
| Waited Party | A party who places a call to a CIDCW customer engaged in a talking connection with another party, receives CIDCW treatment, and whose call has not yet been answered. |

§2.1 Basic Method
§2.1.1 Function

In a first embodiment of the present invention, methods and apparatus are provided to dynamically delegate one of a number of off-hook CIDCW compliant CPEs to respond to a received CAS signal. Basically, each of the CIDCW compliant CPEs which share a customer line are provided with a delay variable. The delay variable may be preprogrammed by the manufacturer of the CPEs, based on a user switch selection, or assigned after CPEs are connected to a customer line (e.g., during initial powering, upon re-powering, upon resetting, upon CAS detection, or upon off-hook). The delay variable controls a time delay between the detection of a CAS on the line and an extension off-hook process (described below) executed by each of the CPEs (or alternatively, by each of the off-hook CPEs). In accordance with the method of the present invention, the off-hook CPE having the latest time slot will assume responsibility for returning the acknowledgment signal.

§2.1.2 Structure

Figure 6:
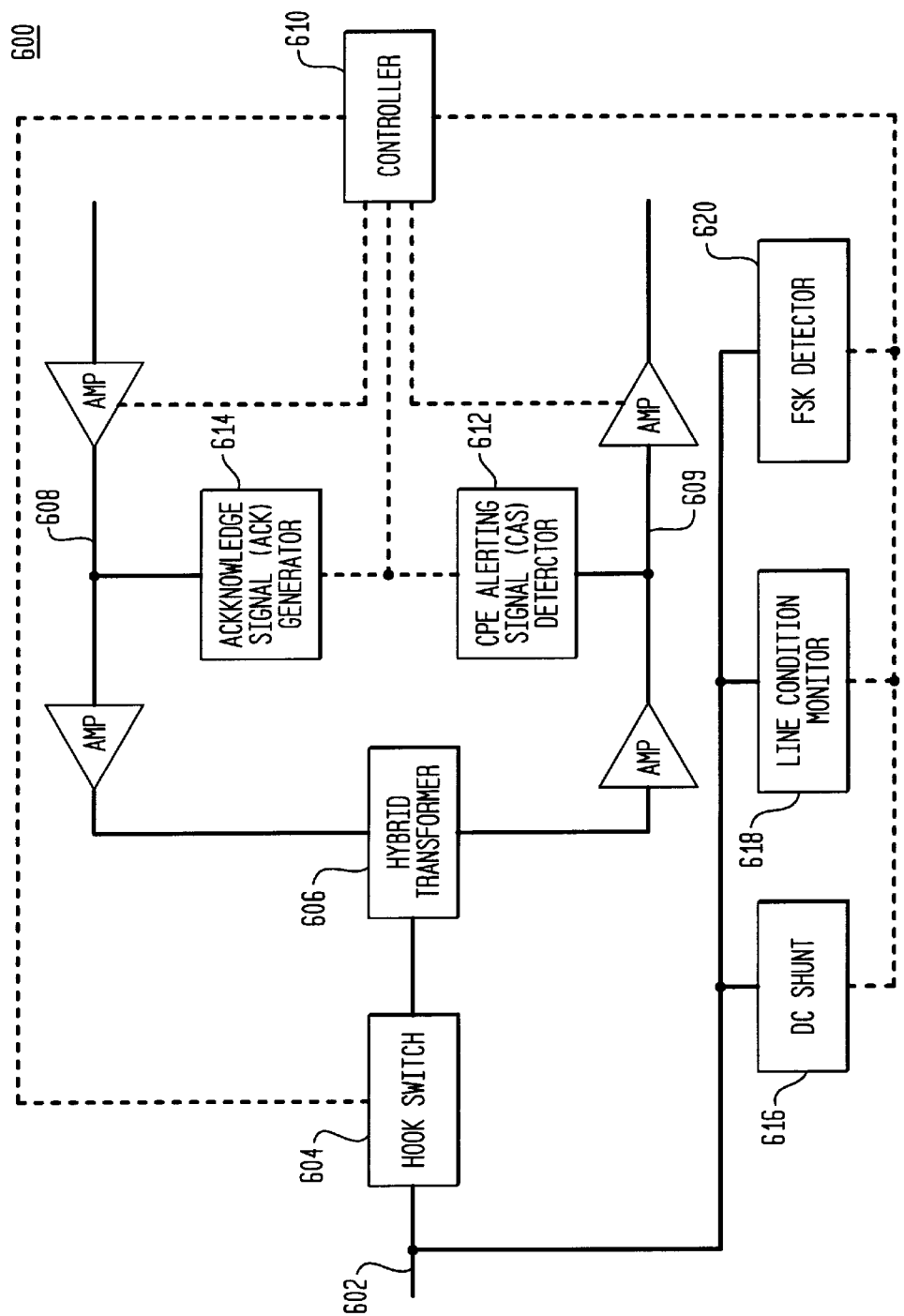
FIG. 6 is a block diagram of a CIDCW compliant piece of customer premises equipment.

FIG. 6 is a block diagram of a CIDCW compliant piece of customer premises equipment 600 which is configured to operate in accordance with the method of the present invention. A hook switch 604 of the CPE 600 terminates the tip and ring lines of a twisted pair ("the line") 602. The state of the hook switch 604 may be altered by the controller 610. If, for example, the CPE is a telephone, the hook switch 604 is typically in the on-hook state when the handset of the telephone is on the cradle and in the off-hook state when the handset of the telephone is lifted from the cradle.

The twisted pair 602 is also coupled with a DC shunt 616, a line condition monitor 618, and an FSK detector 620. The DC shunt may be controlled by the controller 610 to connect a shunt resistor across the tip and ring of the line 602. The line condition monitor 618 monitors the voltage between the tip and ring lines ($V_{line}$) of the twisted pair 602 and provides one of three states to the controller 610 based on the detected state. For example, the line condition monitor 618 may report an "on-hook" line state when $V_{line} > 18V$, an "off-hook" line state when $2V < V_{line} \leq 18V$, and a "flash request" line state when $V_{line} \leq 2V$. Finally, the FSK detector 620 is used to detect, and preferably decode, FSK modulated data. As shown by the dashed line, the DC shunt 616, the line condition monitor 618, and the FSK detector 620 can communicate with the controller 610.

The hybrid transformer 606 interfaces the tip and ring lines to a two (2) wire transmission path 608 and a two (2) wire reception path 609. A CAS detector 612 is provided on the reception path for detecting the presence of a CAS signal on the line. As shown by the dashed line, the CAS detector 612 can communicate the detection of a CAS on the line to the controller 610. An ACK signal generator 614 is coupled with the transmission path 608 for generating an ACK signal on the transmission path 608 in response to a command from the controller 610 via the dashed control line. Amplifiers on the reception 609 and transmission 608 lines may be controlled by the controller 610 such that the controller may mute the talking (transmission) path 608 and the listening (reception) path 609.

The controller 610 preferably includes a storage device (not shown) for storing instructions, a processor (not shown) for executing the stored instructions based on, inter alia, different states of the line, an input/output interface (not shown) for communicating with the other elements of the CPE 600, and timing means (not shown).

§2.1.3 Operation

Figure 5:
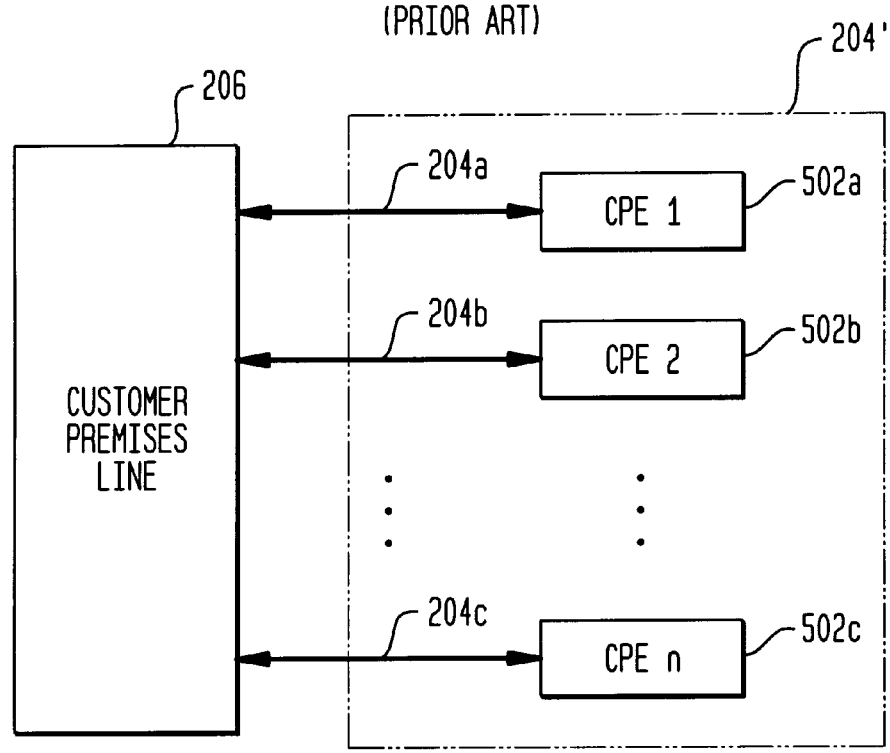
FIG. 5 is a block diagram which illustrates a customer line shared by more than one piece of customer premises equipment.
Figure 7:
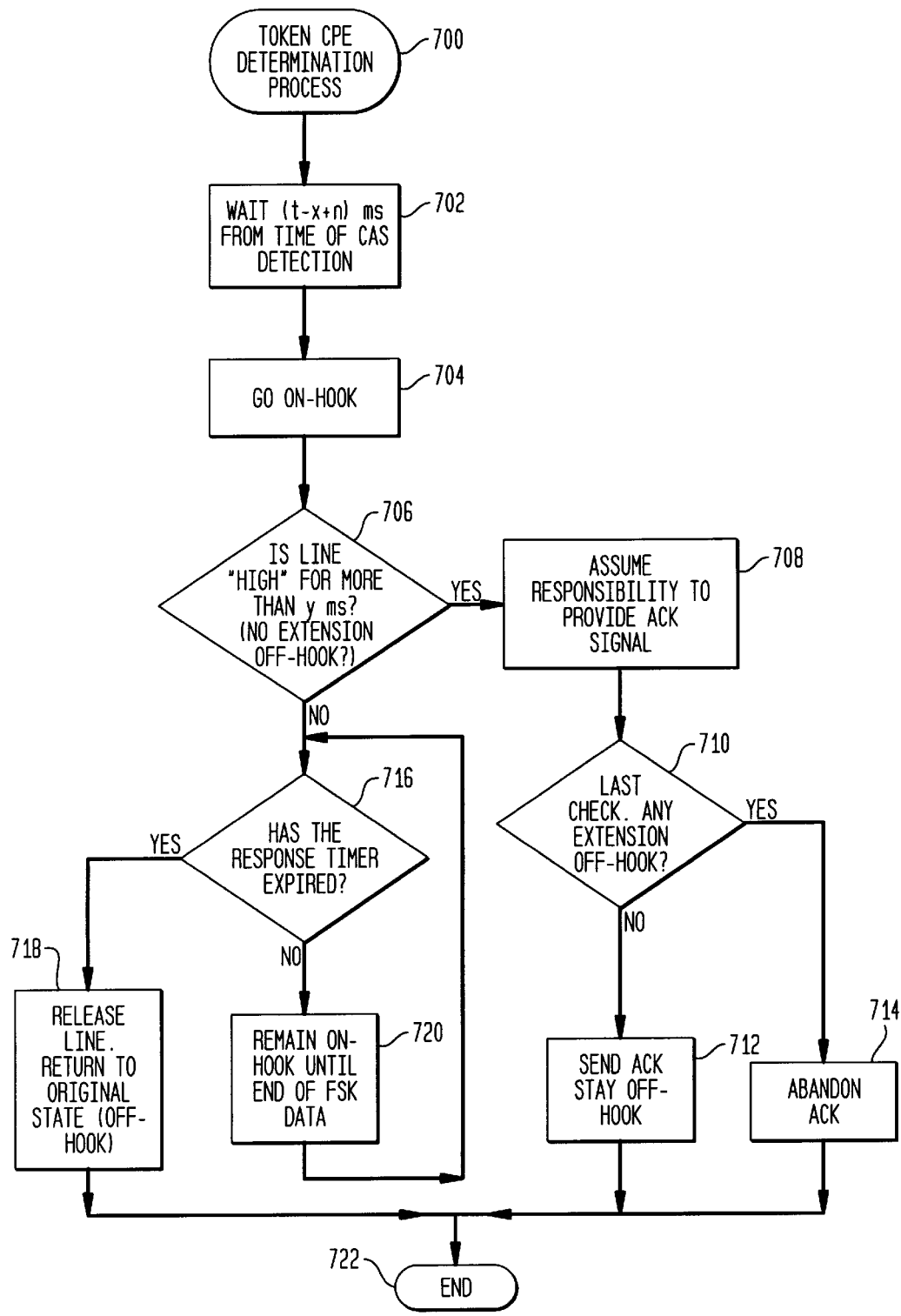
FIG. 7 is a flow diagram of a process for determining a token CPE for sending an ACK signal on a line having more than one attached CPE.

FIG. 7 is a flow diagram of a process 700 for determining a token CPE for sending an ACK signal on a line having more than one attached CPE (See e.g., FIG. 5.). Each CPE 600 (502) attached to the line 602 (206) will perform this process 700 in response to the detection of a CAS. The only difference among the CPEs 600 (502) is that each CPE will have a different assigned time delay value n. More specifically, in each CPE 600 (502) attached to the line 602 (206), when the CAS detector 612 determines the presence of a CAS on the reception path 609, it informs the controller 610. In response, the controller 610 executes a stored program to effect the process 700. In the following, it is assumed that the CAS signal has a duration of t (e.g., 85) ms, that the CPE 600 requires, on average, x (e.g., 40) ms to detect the CAS, and that the CPEs 600 are assigned delays of $n_1, n_2, \ldots n_m$ (e.g., 4, 8, and 12 for three CPEs 600 (502) connected to the line 602 (206)).

First, as shown in step 702, after the CAS is detected by the CPE 600, the CPE will wait w=(t−x+n) ms. For example, if the CPE 600 has a time delay n of 8 ms assigned to it and requires, on average, 40 ms to detect a CAS, the delay may be (85 ms−40 ms+8 ms)=49 ms from the CAS detection (or 8 ms from the end of the CAS). The delay ensures that the CAS is complete before further processing begins. Since each CPE 600 should be assigned a different time delay n, and since differences in average CAS detection times of the CPEs are compensated with detection delay compensation value x, each will perform the following processes during different times.

After the delay, as shown in step 704, the CPE goes on-hook. More specifically, the controller 610 instructs the hook switch 604 to go on-hook. Next, in decision step 706, it is determined whether the line 602 is "high" for more than a predetermined time y (e.g. 4 ms). For example, the line condition monitor 618 determines whether the voltage $V_{line}$ of line 602 is greater than 18V for more than a predetermined time. If the voltage of the line 602 is high for more than the predetermined time, no other extensions are off-hook. Thus, as shown in step 708, the CPE 600 will become the token CPE, i.e., the CPE 600 responsible for providing an ACK signal.

Next, as shown in decision step 710, the CPE 600 checks one last time to determine whether any extensions are off-hook. If no extensions have gone off-hook, as shown in step 712, the CPE will generate the ACK signal on the line 602 and stay off-hook. More specifically, the controller 601 will instruct the ACK generator 614 to place an ACK signal on the transmission path 608. The processing by the CPE 600 then ends at termination node 722. Since the ACK signal has been placed on the line 602, the central office switch 202 will send the caller identity data as FSK modulated data.

Returning to the decision step 710, in the unlikely event that any of the extensions are off-hook during the last check, the CPE will not generate the ACK signal as shown in step 714. Returning to the decision step 706, if the line is not "high" for more than a predetermined time (i.e., if another extension is off-hook), then the CPE will not generate an ACK signal. In this case, the other off-hook extension(s) will determine whether it is the token CPE.

Figure 4A:
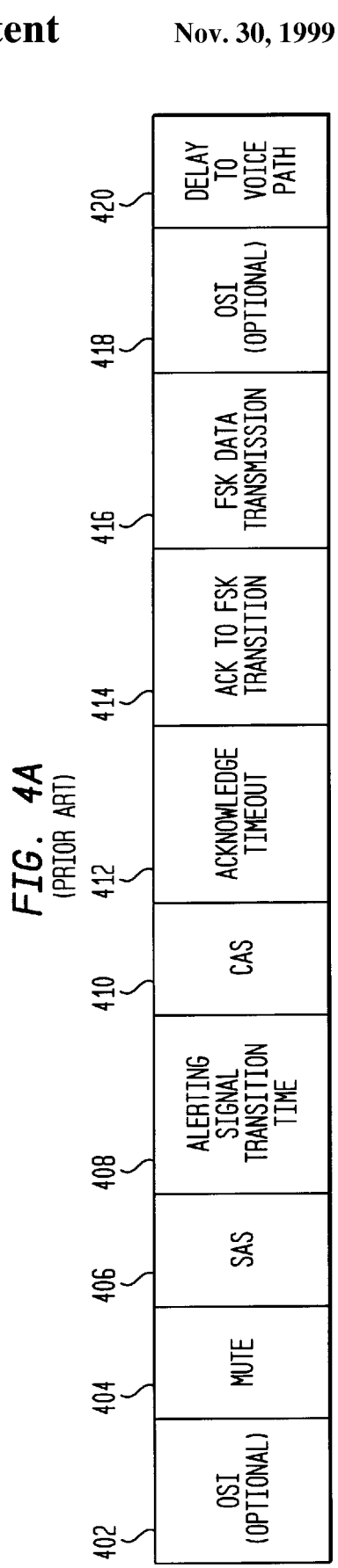
FIG. 4A is a timing diagram of the transmission of caller identity data after a successful handshake sequence.
Figure 4B:
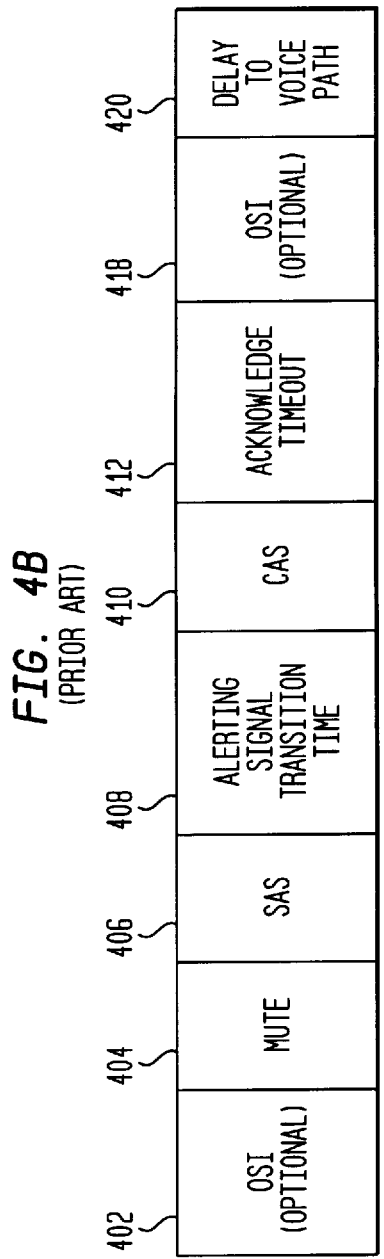
FIG. 4B is a timing diagram of an unsuccessful handshake sequence.

As discussed above with reference to FIGS. 4A and 4B, the ACK response must be sent within an ultimate response time (Acknowledge Time-out 412) from the time of the CAS signal, otherwise the FSK caller identity data will not be provided. As shown in steps 716 and 720, the non-token CPE 600 should remain on-hook until each of the CPEs 600 determine whether they are the token CPE and the FSK caller identity data is received. Otherwise, as shown in decision steps 716 and 718, once the time for providing an ACK signal and for receiving any FSK caller identity data has expired (see e.g., FIG. 4A), the CPE 600 releases (i.e., un-mutes) the line and returns to the off-hook state.

In a preferred embodiment, while the non-token CPE is on-hook, it will continue to monitor the condition of the line to see if the line condition goes on-hook. If the line condition does go on-hook, this indicates that another CPE has assumed responsibility as the token CPE. In such a case, the non-token CPE will remain on-hook through the data transmission. On the other hand, if the line condition does not go on-hook, this indicates that a non-CIDCW compliant CPE is off-hook, that no CPE will assume responsibility as a token CPE, and that no acknowledgment signal or data transmission will occur. Thus, in such a case, the non-token CPE will resume its pre-CAS state sooner.

The method 700 of the invention is now described in an example in which first, second, and third CIDCW compliant (e.g., Type 2 or Type 3) CPEs 600 and a fourth non-compliant (e.g., Type 1) CPE share a line 602. In the example, it is assumed that the first CPE has a delay time of n=4 ms, the second CPE has a delay time of n=8 ms, and the third CPE has a delay time of n=12 ms, the CAS has a duration of 85 ms and the CIDCW compliant CPEs take x ms to detect the CAS. In a first scenario, it assumed that the first and second CPEs are talking with a far-end party 210 (i.e., are off-hook) and that the third and fourth CPEs are on-hook when a waited party calls.

FIGS. 8A through 8E are timing diagrams which illustrate the operations of the process 700 in the above scenario. More specifically, FIG. 8A illustrates the timing of the CAS and ACK signals, FIG. 8B illustrates the hook state of the first CPE, FIG. 8C illustrates the hook state of the second CPE, FIG. 8D illustrates the hook state of the third CPE, and FIG. 8E illustrates the hook state of the fourth CPE. As shown in FIGS. 8A to 8E, when the CAS is applied to the line by the central office switch at $t_1$, the first and second CPEs are off-hook and the third and fourth CPEs are on-hook. The first, second, and third CPEs detect the CAS within x ms, i.e., at $t_2=t_1+x$ ms. Although, in this example, the average CAS detection delays (x) for each of the CPEs are considered to be the same, different CPEs may detect a CAS, on average, after different delays. Thus, the detection delay compensation value x may differ for each CPE.

After detecting the CAS, the first CPE waits for 89−x ms (i.e., 85−x+4, or 4 ms after the CAS end) (see step 702) and then goes on-hook at time $t_3$ (see step 704). Since the second CPE is still off-hook (see FIG. 8C and step 706), the first CPE stays on-hook until the end of the acknowledgment time-out and the FSK caller identity data transmission and then releases the line and goes back off-hook at $t_7$ (see steps 716, 718, and 720).

Concurrently with the processing by the first CPE, after detecting the CAS, the second CPE waits for 93−x ms (i.e., 85−x+8, or 8 ms after the CAS end) (see step 702) and then goes on-hook at time $t_4$ (see step 704). Since all of the CPEs are on-hook as determined by the line condition monitor 618, the second CPE will assume responsibility for generating the ACK signal (see step 708). Since no extensions have gone off-hook, the second CPE goes back off-hook at time $t_5$ and then generates the ACK signal (see steps 710 and 712).

Finally, concurrently with the processing by the first and second CPEs, after detecting the CAS, the third CPE waits for 97−x ms (i.e., 85−x+12, or 12 ms after the CAS end) (see step 702) and remains on-hook at $t_6$ (see step 704). Since the second CPE has already gone back off-hook before time $t_6$, the third CPE detects that another extension is off-hook, it remains on-hook (see steps 706, 716, 718, and 720.).

If the above scenario were changed such that the fourth CPE was off-hook, no ACK would be generated since the CIDCW compliant CPEs would always detect the off-hook condition of the fourth CPE.

In a preferred embodiment of the present invention, only off-hook CPEs perform the process 700. In this way, the token CPE need not return off-hook before other subsequent on-hook CPEs check the line. In such an embodiment, on-hook CPEs would not participate in the token selection process.

Once the FSK caller identity data is received and presented to the user, the user may decide to connect the waited party and place the far-end party on hold by providing a flash signal for example.

§2.2 Method which Distinguishes Type 2 and Type 3 CPEs
§2.2.1 Function

Although the above described method will work with any combination of CPE types, it does not distinguish between Type 2 and Type 3 CPEs. However, as discussed above, Type 2 and Type 3 CPEs generated different ACK signals to inform the central office switch of the capabilities presently available in the off-hook station sets. Since the functionality of Type 3 CPEs supersedes that of Type 2 CPEs, the central office switch will provide enhanced data in response to a Type 3 CPE ACK. Thus, having an off-hook Type 3 CPE provide the ACK is preferred so that the functionality of the Type 3 CPE can be fully utilized. In a second method of the present invention, Type 2 and Type 3 CPEs are assigned to different time slot groups so that if a Type 3 CPE is off-hook when a CAS is received, a Type 3 ACK will be generated rather than a Type 2 ACK.

§2.2.2 Structure

Basically, any CIDCW compliant CPE, including Type 2 and Type 3 CPEs, will include the elements of the CPE 600 described above with reference to FIG. 6. In this case, the memory (not shown) of the controller 610 will include program instructions for implementing the process 900 described below.

§2.2.3 Operation

Figure 9:
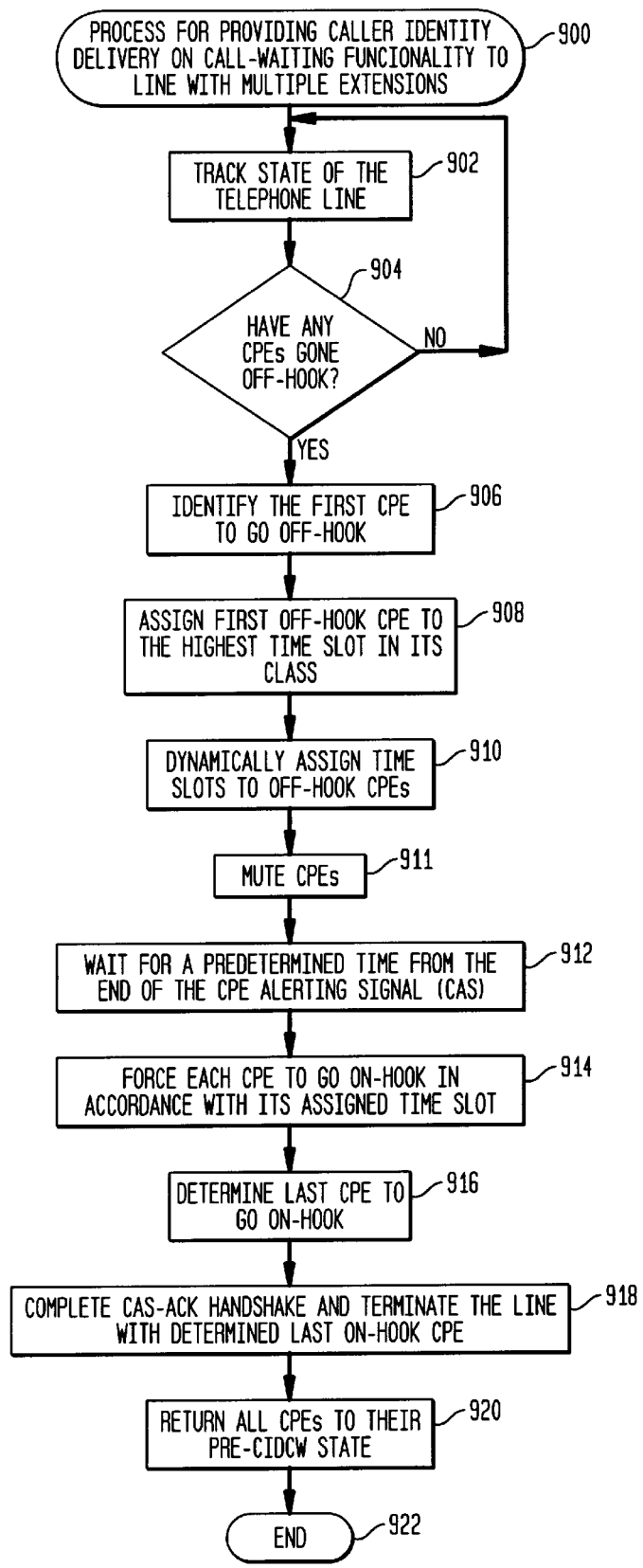
FIG. 9 is a flow diagram of a process for providing caller identity call waiting functionality to a customer line having more than one piece of customer premises equipment.

FIG. 9 is a flow diagram of the method 900 of the present invention which provides caller identity delivery on call waiting functionality to a line with multiple extensions. Again, as will be apparent from the description below, the method 900 treats Type 2 and Type 3 CPEs somewhat differently such that if a Type 3 CPE is off-hook, it or another Type 3 CPE will generate an ACK in response to a CAS.

In the following description, it is assumed that in the initial state of the system in which the method 900 operates, each of the CPE(s) is on-hook. First, as shown in step 902, each Type 2 and/or Type 3 CPE connected with the line tracks the state of the line. Again, this tracking may be accomplished by means of a line condition monitor 618. As shown in decision step 904, if none of the CPEs have gone off-hook, the tracking continues. If, however, a CPE has gone off-hook, that CPE is identified as the first CPE to go off-hook as shown in step 906. More specifically, referring to FIG. 6, the controller 610 can determine the state of its hook switch 604 when the line condition monitor 618 reports a on-hook to off-hook line condition transition. If the terminal is an adjunct, this determination may be carried out with a line current sensor. Next, as shown in step 908, the first CPE to go off-hook is assigned to the highest time slot in its class. As shown in step 910, CPEs subsequently going off-hook are assigned time slots, other than the highest time slot, within their class of time slots. The assignment of CPEs to time slots is more fully described with reference to FIG. 10.

FIG. 10 is an exemplary timing diagram which illustrates groups of time slots 1002, to which CPEs are assigned, which follow a CAS signal 1004. A delay 1012 between the end of the CAS signal 1004 and the time slots 1002 may be provided. This delay 1012 allows for reasonable CAS detection (e.g., by CAS detector 612) and validation delay. The delay 1012 is preferably 20 ms. A first group of time slots 1008, which includes time slots $ts_{11}, ts_{12}, \ldots ts_{1n}$ may be associated with CIDCW compliant CPEs which support little other services (e.g., Type 2 CPEs). A last group of time slots 1010, which includes time slots $ts_{21}, ts_{22}, \ldots ts_{2m}$ may be associated with CIDCW compliant CPEs which support the most enhanced service (e.g., Type 3 CPEs). Although the invention is described as grouping time slots for Type 2 and Type 3 CPEs, further groups of time slots may be provided if other classes of CPEs are developed. In any event, it is preferred that the class of CPE having the most advanced functionality be provided with the last group of time slots. Referring back to FIG. 9, if the first CPE off-hook is not a CIDCW compliant CPE, the last time slots in each group are not used.

Once time slot selection has occurred, each CIDCW compliant CPE maintains its time slot selection until a predetermined time period after all CPEs have gone on-hook. This condition is determined by the line condition monitors 618 of each CPE 600. The predetermined time period, which may be 1550 ms for example, is based on the maximum hook flash duration. That is, an on-hook line condition for less than the predetermined time period (e.g., 1100 ms) will not be interpreted as a hook flash signal, while an on-hook line condition for more than the predetermined time period (e.g., 1550 ms may be interpreted as a line disconnect. Under a line disconnect condition, the unit shall reset itself (i.e., release it current time slot and become available to receive a new call).

The last time slot (e.g., $ts_{2m}$) must end before a time-out period 1006, following the end of the CAS 1004, expires. As discussed above with reference to element 412 in FIGS. 4A and 4B, the time-out period 1006 (412) from the perspective of the central office switch is preferably between 155 and 165 ms. However, since network latencies can exist, from the perspective of the CPE, an ACK signal must start before the expiration of a shorter (e.g., 100 ms) time-out period. Thus, the sum of the time of the delay 1012 and the time slots 1002 should be less than 100 ms.

Referring to FIGS. 9 and 10, if the first off-hook CPE is a Type 2 CPE, it will be assigned to time slot $ts_{1n}$. If, on the other hand, the first off-hook CPE is a Type 3 CPE, it will be assigned to the time slot $ts_{2m}$. Although the number of time slots is limited by the length of each time slot, the length of the delay 1012 and the time-out period 1006, the number of time slots should be maximized to the extent possible. This is because, once the first-off hook CPE is assigned to the highest time slot in its class, CPEs that go off-hook later are assigned randomly to time slots, other than the last time slot, within its class. It is possible that more than one CPE may be assigned to the same time slot. This is undesirable since, as will become apparent below, if more than one CPE is assigned to the same time slot, it is possible that both will generate an ACK signal which, as discussed above, is undesirable. However, this possibility is reduced as the number of time slots within the class increases. The number of time slots n in the first group 1008 may be equal to the number of time slots m in the last group 1010.

Referring back to FIG. 9 (after step 910), one or more CPEs are off-hook (e.g., connected with a far-end party) when a waited party calls the premises. At this point, the central office switch will place a CAS on the customer's line to alert CIDCW compliant CPEs that an identifiable party is waiting. First, as shown in step 911, all CIDCW compliant CPEs mute themselves. More specifically, referring back to FIG. 6, in each CIDCW compliant CPE, the controller 610 mutes both the transmit 608 and receive 609 paths. Next, as shown in step 912, each off-hook CPE will wait for a predetermined period (see e.g., delay 1012 of FIG. 10) of time from the end of the CAS. More specifically, referring back to FIG. 6, upon detecting a CAS signal, the controller 610 of each off-hook CPE will start a first timer, which compensates for the time to detect the CAS and the length of the CAS, which determines the time since the end of the CAS. Each on-hook CPE starts a similar timer, referred to as the second timer. Next, as shown in step 914, based on the first timer, each off-hook CPE goes on-hook in accordance with its assigned time slot. This step is analogous to steps 702 and 704 of process 700. Next, as shown in step 916, the last CPE to go on-hook is determined. This step is analogous to steps 706, 708, and 710 of process 700. More specifically, the only time an immediate change in the line status, as determined by the line condition monitor 618 will occur is when the last off-hook CPE goes on-hook. Otherwise, when an off-hook CPE goes on-hook while other CPEs remain off-hook, the line voltage will only be modified slightly and the line condition monitor 618 will continue to determine an off-hook line condition (Recall for example, that when a line voltage of greater than 2V but less than or equal to 18V, the line status may be interpreted as off-hook.). Next, as shown in step 918, the last on-hook CPE will generate an ACK to complete the CAS-ACK handshake. Moreover, the last on-hook CPE will terminate the line so that each of the CIDCW compliant CPEs may receive the FSK caller identity data transmission. At the end of the FSK data transmission, as determined by the expiration of a response timer (see analogous steps 716, 718, and 720 of process 700), or alternatively, as determined by the FSK detector 620 and the controller 610, all of the CPEs are un-muted and returned to their pre-CIDCW (i.e., pre-CAS) un-muted state as shown in step 920.

If the first timer expires without an on-hook condition, that is, if the first timer has counted through all of the time slots 1002 and the line condition is still off-hook, no data transmission will occur. Referring to steps 916 and 918 of process 900, since the last on-hook CPE cannot be determined, the CAS-ACK handshake is not completed. This condition will occur if a non-CIDCW compliant CPE (e.g., a Type 1 CPE) is off-hook. The FSK caller identity data transmission will not occur in such a case because, as discussed above, such in-band signaling is annoying to listen to and can be corrupted by voice signals. To reiterate, non-CIDCW compliant CPEs are not required to (and typically cannot) mute their transmit and receive paths in response to a CAS.

The controller 610 of each of the CIDCW compliant CPEs must continue to check the line condition monitor 618 so that if an on-hook line condition occurs during the time of the time slots 1002, the controller 610 can prepare the FSK detector 620 to receive the caller identity data. In this way, the call logs in all of the CIDCW compliant CPEs (even those that were on-hook when the CAS was on the line) will be consistent. Again, if the first or second timers expire at the end of the time slots without an on-hook condition, the CAS-ACK handshake will not take place and the FSK caller identity data will not be transmitted. Accordingly, the CIDCW compliant CPEs will immediately un-mute their transmit and receive paths.

As will be confirmed by the following examples, the method 900 permits an off-hook CIDCW compliant CPE belonging to the class having the highest functionality to provide the ACK signal.

FIG. 11 illustrates an exemplary time slot arrangement which may be used with CIDCW customers having Type 1, Type 2, and/or Type 3 CPEs connected to a line. As shown in FIG. 11, the time period 1112 between the end of the CAS 1104 and the start of the first time slot $ts_{11}$ is 20 ms. Off-hook Type 2 CPEs are assigned to one of the four time slots ($ts_{11}$, $ts_{12}$, $ts_{13}$, and $ts_{14}$) of the first group 1108 while off-hook Type 3 CPEs are assigned to one of the four time slots ($ts_{21}$, $ts_{22}$, $ts_{23}$, and $ts_{24}$) of the second group 1110. As shown, each of the time slots is eight (8) ms, such that time slot $ts_{11}$ starts at 20 ms and ends at 27 ms, time slot $ts_{12}$ starts at 28 ms and ends at 35 ms, time slot $ts_{13}$ starts at 36 ms and ends at 43 ms, time slot $ts_{14}$ starts at 44 ms and ends at 51 ms, time slot $ts_{21}$ starts at 52 ms and ends at 59 ms, time slot $ts_{22}$ starts at 60 ms and ends at 67 ms, time slot $ts_{23}$ starts at 68 ms and ends at 75 ms, and time slot $ts_{24}$ starts at 76 ms and ends at 83 ms.

FIGS. 12A through 12E are timing diagrams which illustrate the operation of the process 900 of FIG. 9 under a first scenario. In the first scenario, two (2) Type 2 CPEs are off-hook when a CAS is applied to the line. FIG. 12A illustrates the line voltage over time, FIG. 12B illustrates the line condition over time, FIG. 12C illustrates the hook state of the first CPE over time, FIG. 12D illustrates the hook state of the second CPE over time, and FIG. 12E illustrates the time slots of FIG. 11. More specifically, in the first scenario, the first Type 2 CPE went off-hook first, and is therefore assigned to the last time slot $ts_{14}$ of the first group 1108, while the second Type 2 CPE went off-hook next, and is assigned to a random one of the remaining time slots (e.g., time slot $ts_{12}$) of the first group 1108.

Recall from step 911 of FIG. 9, that both the first and second Type 2 CPEs will first mute themselves in response to the detected CAS 1104. As shown in FIG. 12D, the second Type 2 CPE goes on-hook at the start of time slot $ts_{12}$ (See also step 914 of FIG. 9.). As shown in FIG. 12A, the line voltage increases slightly when the second Type 2 CPE goes on-hook; however, the line condition monitor 618 will still determine an off-hook condition as shown in FIG. 12B. As shown in FIG. 12C, the first Type 2 CPE goes on-hook at the start of the time slot $ts_{14}$ (See also step 914 of FIG. 9.). As shown in FIG. 12A, the line voltage increases significantly when the first Type 2 CPE goes on-hook such that the line condition monitor 618 will determine an on-hook state as shown in FIG. 12B. Thus, referring back to steps 916 and 918 of FIG. 9, the first Type 2 CPE is the last CPE to go on-hook and therefore will go back off-hook and generate the ACK signal on its transmission path.

The first Type 2 CPE will also terminate the line. Line termination is needed for two reasons. First, at least one CPE must continue to draw current to hold the connection with the far-end party. Second, the AC termination reduces unwanted signal reflections and echo during data transmission. All other CPEs remain on-hook until the end of the FSK caller identity data transmission to avoid multiple line terminations which reduce the FSK data signal level. However, each CIDCW compliant CPE will detect the FSK data. As shown in FIG. 12D, the second Type 2 CPE will remain on-hook until the end of the FSK caller identity data transmission.

The change in line condition shown in FIG. 12B is perceived by all of the CIDCW compliant CPEs. Since the line condition changed before the expiration of the first and/or second timers discussed above, the CIDCW compliant CPEs know that an FSK caller identity data transmission will occur. If, on the other hand, the line condition did not go on-hook during the 84 ms time period following the CAS, the CIDCW compliant CPEs would determine that a non-CIDCW compliant CPE was off-hook and that no FSK caller identity data transmission will take place. In either case, the states of the CIDCW CPEs are restored after the expiration of the first and second timers.

In the above example, the last on-hook CPE (the first Type 2 CPE) preferably responds with the ACK signal at about 5 ms into its time slot $ts_{14}$ and not at the 8 ms boundary of its time slot for two reasons. First, the line must not remain in the on-hook state for more than 5 ms. Otherwise, some switching systems may interpret such on-hook signals as a dial pulse or a flash hook signal. Since the line never stays on-hook for more than 5 ms, the line condition monitor must be able to determine the state of the line within 5 ms of a change in the line voltage. Second, the extra three (3) ms before the end of the eight (8) ms time slot act as a buffer to compensate for differences between CPE timing functions. The length of the time slots and the timing of the ACK signal may be modified as long as the above goals are achieved.

In the first scenario described above, the last CPE to go on-hook (i.e., the first Type 2 CPE) will come off-hook at or about 49 ms (i.e., 44 ms+5 ms) from the end of the CAS. The ACK signal should start within 16 ms after the CPE responsible to complete the CAS-ACK handshake has gone off-hook. This is because an ACK signal should be sent within 100 ms of the end of the CAS. Thus, if the a Type 3 CPE were to go off-hook first, it would be assigned to time slot $ts_{24}$ which ends at 84 ms. The Type 3 CPE would go back off-hook at or about 81 ms, and in the worst case, at 84 ms. Thus, in the worst case, the Type 3 CPE would generate the ACK signal at 100 ms (84 ms+16 ms).

Moreover, to compensate for the effects of echo suppresser hangover, a Type 3 CPE should not attempt to generate an ACK signal until at least 75 ms after the end of the CAS. More specifically, Type 3 CPEs, but not Type 2 CPEs, can access information services using the ADSI protocol. The ADSI protocol also uses a CAS, ACK, and FSK data transfer sequence to the CPE. On possible international connections with an information service, in which an echo suppressor is used to control delayed echo returns that can disrupt the data transfer, the ACK signal of the Type 3 CPEs can not be launched back to the service host computer that sent the CAS until the echo suppressor can provide a low loss path back to the host. An echo suppressor that was providing a low loss path in the host to CPE direction to allow transport of the CAS, also provides a high loss path from the CPE to the host to absorb (i.e., attenuate) the echo of the CAS back to the host during CAS transmission and maintains the high loss path for about 75 ms after the end of the CAS to absorb (i.e., attenuate) any CAS echo toward the host. If the ACK were sent during this 75 ms time, it would also be absorbed (i.e., attenuated) by the high loss path back to the host. Consequently, the host might not be able to recognize the ACK. Thus, the CPE must wait until the echo suppressor path loss is removed before sending the ACK. After the 75 ms time, the echo suppressor will provide a low loss path back to the host and a high loss path toward the CPE, which is desired during generation of the ACK signal.

In a preferred embodiment of the process 900, when a Type 2 CPE is responsible for generating the ACK signal, a nominal 60 ms ACK signal is generated 8 ms after the Type 2 CPE has returned to the off-hook state, and when a Type 3 CPE is responsible for generating the ACK signal, a nominal 60 ms ACK signal is generated no sooner than 75 ms after the CAS and no later than 8 ms after the end of its time slot boundary if the time slot boundary exceeds 75 ms (see e.g., time slots $ts_{23}$ and $ts_{24}$.).

FIGS. 13A through 13E are a timing diagrams which illustrate the operation of the process 900 of FIG. 9 under a second scenario in which a Type 2 CPE and a Type 3 CPE are both off-hook when a CAS is detected. FIG. 13A illustrates the line voltage over time, FIG. 13B illustrates the line condition over time, FIG. 13C illustrates the hook state of the Type 3 CPE over time, FIG. 13D illustrates the hook state of the Type 2 CPE over time, and FIG. 13E illustrates the time slots of FIG. 11. More specifically, in the second scenario, the Type 2 CPE went off-hook first, and is therefore assigned to the last time slot $ts_{14}$ of the first group 1108, while the Type 3 CPE went off-hook next, and is assigned to a random one of the time slots ($ts_{21}$, $ts_{22}$, or $ts_{23}$), but not the last time slot ($ts_{24}$), of the second group 1110. In this instance, it is assumed that the Type 3 CPE is assigned to the time slot $ts_{23}$.

Referring to FIGS. 13D and 13A, when the Type 2 CPE goes on-hook at 44 ms after the end of the CAS, only a slight change in the line voltage occurs. This is because the Type 3 CPE is still off-hook as shown in FIG. 13C. Thus, as shown in FIG. 13B, the line condition status does not yet change, i.e., the line status is still off-hook. Since the Type 2 CPE is not the last on-hook CPE, it remains on-hook.

Referring now to FIGS. 13C and 13A, when the Type 3 CPE goes on-hook at about 68 ms after the end of the CAS, the line voltage undergoes a substantial change. This is because the Type 3 CPE is the last CPE to go on-hook, and this fact is determined by the line condition monitor 618 as shown in FIG. 13B. Since the Type 3 CPE is the last to go on-hook, it goes back off-hook, generates an ACK signal, and terminates the line while the central office switch transmits the FSK caller identity data. At the end of the FSK caller identity data transmission, the CIDCW compliant CPEs un-mute themselves and return to their original (pre-CAS) state.

FIGS. 14A through 14E are timing diagrams which illustrate the operation of the process 900 of FIG. 9 under a third scenario in which a Type 2 and Type 1 CPE (or any other CPE not operating in accordance with the present invention) are off-hook when a CAS is detected. FIG. 14A illustrates the line voltage over time, FIG. 14B illustrates the line condition over time, FIG. 14C illustrates the hook state of the Type 2 CPE over time, FIG. 14D illustrates the hook state of the Type 1 CPE over time, and FIG. 14E illustrates the time slots of FIG. 11. More specifically, in the third scenario, the Type 1 CPE (or any other CPE not operating in accordance with the present invention) went off-hook first, while the Type 2 CPE went off-hook next, and is assigned to a random one of the time slots ($ts_{11}$, $ts_{12}$, or $ts_{13}$), but not the last time slot ($ts_{14}$), of the first group 1108. In this instance, it is assumed that the Type 2 CPE is assigned to the time slot $ts_{13}$.

Referring to FIGS. 14C and 14A, when the Type 2 CPE goes on-hook at about 36 ms after the end of the CAS, only a small change in the line voltage occurs because the Type 1 CPE (or any other CPE not operating in accordance with the present invention) is still off-hook. Thus, as shown in FIG. 14B, the line condition monitor determines no change in the off-hook status. Accordingly, the Type 2 CPE stays on-hook. Since no ACK signal is generated during the time-out period 1106 as timed by the first and second timers of the controller 610, the central office switch will not send the FSK caller identity data. The CIDCW compliant CPEs (i.e., the Type 2 CPE) will un-mute themselves and return to their original (pre-CAS) state.

As the above example illustrates, since the Type 1 CPE (which is not CIDCW compliant) was off-hook, the CAS-ACK handshake was not completed such that no in-band FSK caller identity data was transmitted by the central office switch. To reiterate, this is desirable because the FSK data transmission would be annoying to the un-muted Type 1 CPE and because voice signals from the un-muted Type 1 CPE could corrupt the FSK caller identity data transmission.

FIGS. 15A through 15E are timing diagrams which illustrate the operation of the process 900 of FIG. 9 under a fourth scenario in which a Type 2 CPE is off-hook when the CAS is detected but another CIDCW compliant CPE goes off-hook, but returns on-hook before the CAS is detected. FIG. 15A illustrates the line voltage over time, FIG. 15B illustrates the line condition over time, FIG. 15C illustrates the hook state of a Type 2 CPE over time, FIG. 15D illustrates the hook state of a CIDCW compliant CPE (e.g., a Type 2 or Type 3 CPE) over time, and FIG. 15E illustrates the time slots of FIG. 11. More specifically, in the fourth scenario, as shown in FIG. 15D, the first off-hook CPE has returned to the on-hook state before the CAS is detected. The second CPE went off-hook after the first CPE but remained off-hook. Thus, the first CPE is assigned to time slot $ts_{14}$ if it is a Type 2 CPE or time slot $ts_{24}$ if it is a Type 3 CPE while the second CPE is assigned to a random one of the time slots of the first group 1108 ($ts_{11}$, $ts_{12}$, $ts_{13}$) other than the last time slot $ts_{14}$. In this example, it is assumed that the second CPE is assigned to time slot $ts_{12}$.

As shown in FIGS. 15C and 15A, when the second CPE goes on-hook at about 28 ms after the CAS, the line voltage will significantly change because the first CPE has already gone back-on hook. Consequently, as shown in FIG. 15B, the line condition monitor 618 determines an on-hook status, and the second CPE will go back off-hook to generate an ACK signal and to terminate the line during transmission of the FSK caller identity data. Since, the line condition does not change when the first CPE remains on-hook during the time slot $ts_{14}$, the first CPE will not go off-hook to retransmit the ACK signal and will not terminate the line during the transmission of the FSK caller identity data.

Although the above examples illustrate that the process 900 almost always results in a single CPE generating the ACK signal and terminating the line during the transmission of the FSK caller identity data, there is a small chance that more than one CPE will generate an ACK signal. For example, referring back to the fourth scenario illustrated in FIGS. 15A through 15E, suppose that more than one Type 2 or Type 3 CPE was off-hook after the first CPE went back on-hook before the CAS. In such a case, since each CPE vies for time slots randomly, it is possible that more than one CPE may chose the same last time slot and, consequently, that more than one CPE will generate an ACK signal and terminate the line during the transmission of the FSK user identity data. However, the following must occur before the above situation is possible: (i) the first off-hook CPE must be on-hook during the CAS; (ii) two or more CPEs must remain off-hook during the CAS; (iii) the remaining off-hook CPEs must be CIDCW compliant (e.g., Type 2 or Type 3); (iv) of the remaining off-hook CPEs, there must be either (a) more than one Type 3 CPEs, or (b) more than one Type 2 CPEs and no Type 3 CPEs; and (v) the highest numbered alternative time slot chosen (other than time slots $ts_{14}$ or time slot $ts_{24}$) must be selected by more than one Type 2 or Type 3 CPEs.

In view of the above, the possibility of multiple ACK signal generation and multiple line termination is extremely low. However, a refinement to the method of the present invention will further reduce this possibility. More specifically, the first CPE to go off-hook that returned on-hook before the CAS, may be programmed to go back off-hook in response to the CAS, during the delay period 1112 following the CAS 1104 and preceding the time slots 1102. In this case, if the first off-hook CPE is a Type 3 CPE, multiple ACK generation and line termination is simply not possible. If, however, the first off-hook CPE is a Type 2 CPE, multiple ACK generation and line termination is only possible if more than one off-hook Type 3 CPEs pick the same time slot (e.g., $ts_{21}$, $ts_{22}$, or $ts_{23}$) in the second group 1110 and another off-hook Type 3 CPE does not choose a later time slot.

In any event, even if more than one ACK signal is generated, it will never be by different types of CPEs. That is, either multiple Type 2 CPEs or multiple Type 3 CPEs may generate ACK signals, but a Type 2 and a Type 3 CPE will never generate ACK signals. Moreover, even if multiple ACK signals are generated, a service failure will only occur if the signals corrupt each other to such an extent that the ACK is unrecognizable by the central office switch. This possibility is extremely low.

§2.2.4 Alternative Method which Synchronizes Time Slots

§2.2.4.1 Purpose of Synchronization

To reiterate, the method 900 uses a determine end of a CAS tone detect signal as a timing reference point. (See e.g., steps 912 and 914.) Unfortunately, the CAS tone detect signal is determined locally, at each CIDCW compliant CPE, and variations, due to differences in CAS detector implementations, the CAS level, and the presence of speech for example, of the time of the CAS detection (and thus, the determined CAS end) by the different CPEs can be significant. Although in the above method 900, the CPE manufacturer can bias its time slot clock by an amount equal to the average signal delay (see e.g., step 702 of method 700), actual CAS detection delays may vary from an average delay to such an extent that the CAS tone detection (and thus, the determined CAS end) may be an inadequate time reference to properly synchronize the operation of the method 900 among the various CPEs. Thus, in a preferred embodiment of the present invention, a common synchronization signal, to be used as a time slot reference point, is generated.

§2.2.4.2 Synchronization Method and its Operation

Figure 19:
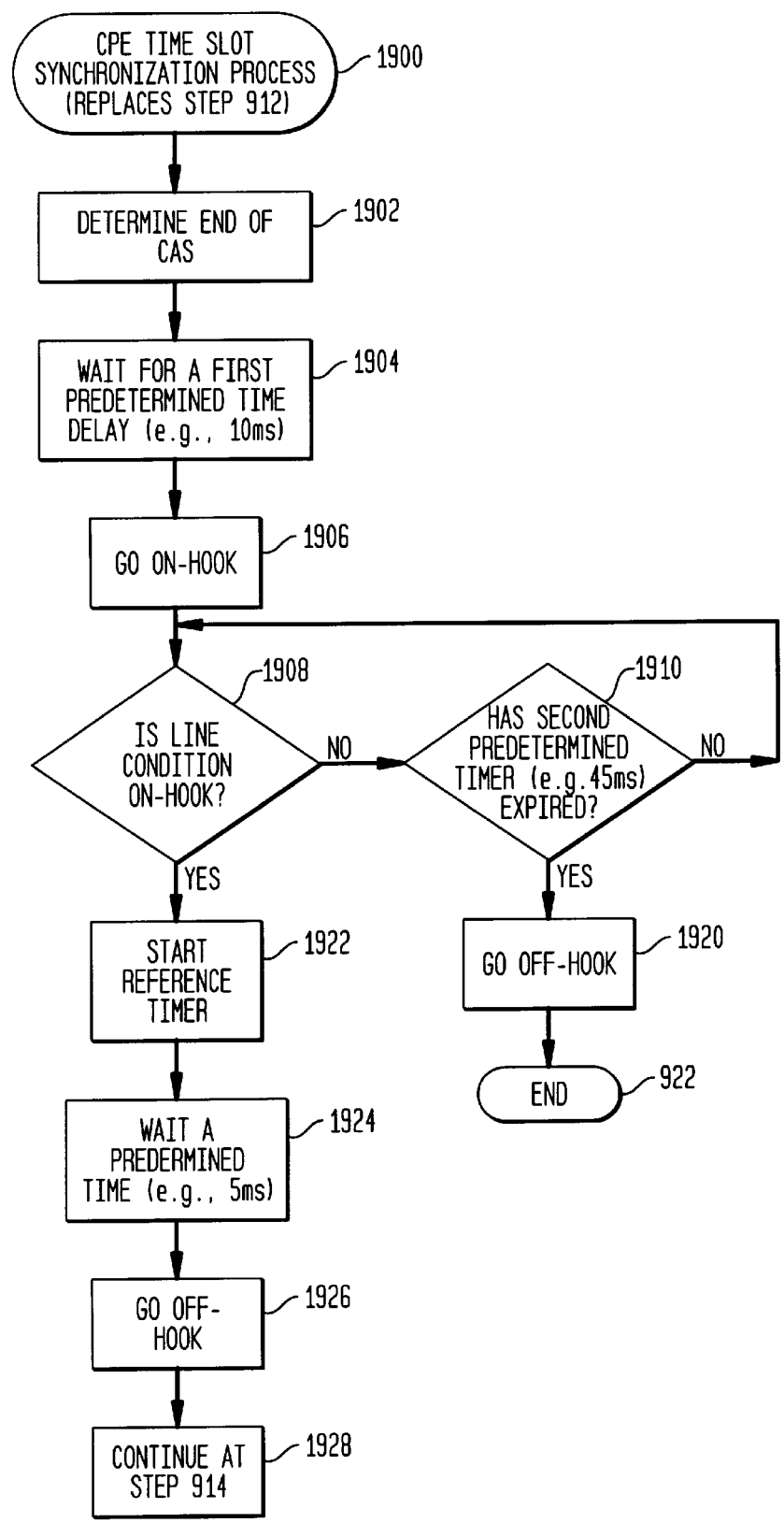
FIG. 19 is a flow diagram of a CPE timing synchronization process used in a preferred embodiment of the method of FIG. 9.

FIG. 19 is a synchronization method 1900 of the preferred embodiment of the process 900. Referring back to FIG. 9, the synchronization method 1900 replaces step 912 which determines time slots from the end of the CAS.

First, as shown in step 1902, in each off-hook CIDCW compliant CPE, the end of the CAS is determined. Next, as shown in steps 1904 and 1906, the CPE waits for a predetermined time delay (e.g., 10 ms) before going on-hook. The predetermined time delay prevents the possible corruption of the CAS so that other CPEs, which have not yet completely verified the CAS, may do so. Not all of the CPEs will necessarily go on-hook at the same time since each may detect the CAS at slightly different times. Referring to time 1820 of the timing diagram of FIG. 18, each CPE will detect the end of the CAS somewhere between $t_1$ and $t_2$.

As shown in decision step 1908, while in the on-hook stage, each CPE will monitor the line condition for a change to on-hook which will occur when the last off-hook CPE goes on-hook. As shown in decision steps 1908 and 1910, if the line condition has not yet changed and a second predetermined timer (e.g., 45 ms) has not yet expired, the CPE will continue to monitor the line condition. As shown in steps 1908, 1910, and 1920, if the predetermined timer expires before the line condition changes to on-hook, the CPE goes off-hook and the process ends at terminal node 922.

If, however, as shown in steps 1908, 1910, and 1922, the line condition is determined to go on-hook before the second predetermined timer expires, a reference timer is started in each of the CPEs. (See e.g., time $t_3$ of FIG. 18.) Since the off-hook to on-hook line condition transition will be detected by each of the CPEs at the same time (for practical purposes), the times of the time slots will be consistent among the CPEs.

As shown in steps 1924 and 1926, after a predetermined time (e.g., 5 ms), each of the CIDCW compliant CPEs that were off-hook when the CAS was detected goes back to its original state (e.g., off-hook). (See e.g., time $t_4$ of FIG. 18.) As shown at node 1928, the process 900 continues at step 914.

Figure 18:
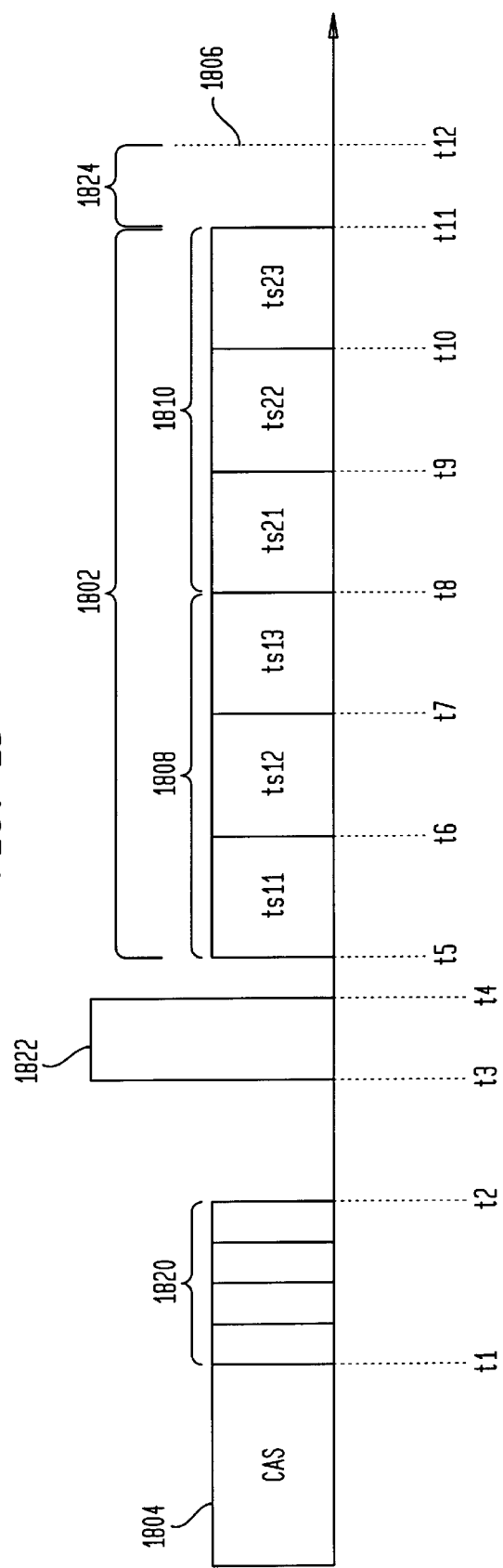
FIG. 18 is a timing diagram of a preferred embodiment of the method of FIG. 9 in which the time slots, as determined by each off-hook CIDCW compliant CPE, are synchronized.

Referring now to the timing diagram of FIG. 18, the time of the synchronization pulse 1822 ($t_3$ to $t_4$), and hence the time slots 1802 will depend on when the last off-hook CPE goes on-hook, which in turn depends on the time of the last CAS detection by a CPE ($t_2$). As shown in FIG. 18, each of the time slot groups 1808 and 1810 has less time slots (e.g., three) than the method in which the reference time was determined from the end of the CAS (e.g., four in FIG. 11). This is because additional time is needed to determine and provide the synchronization signal 1822. This slight decrease in the number of time slots in each group will slightly increase the possibility that more than one CPE will generate an ACK signal and terminate the line during the transmission of the FSK caller identity data as discussed above. However, even this increased possibility should still be acceptable. The interval 1824 between the last time slot ($t_{11}$) and the end of the time-out period 1806 will vary depending on when the synchronization signal 1822 is generated.

Referring again to FIG. 18, in a preferred embodiment of the process 1900:

$(t_2-t_1) \leq 25$ ms;

$t_3 = t_2 + 10$ ms;

$t_4 = t_2 + 15$ ms;

$t_5 = t_2 + 20$ ms;

$t_6 = t_2 + 28$ ms;

$t_7 = t_2 + 36$ ms;

$t_8 = t_2 + 44$ ms;

$t_9 = t_2 + 52$ ms;

$t_{10} = t_2 + 60$ ms;

$t_{11} = t_2 + 68$ ms;

$t_{12} = t_1 + 100$ ms; and $7 \text{ ms} \leq (t_{12} - t_{11}) \leq 32$ ms.

In a further refinement, the delay tolerance of the proposed synchronization method 1900 (i.e., $t_2-t_1$) can be increased to 35 ms by adding a conditional length check on the CAS tone detect signal. In this further refinement, it is assumed that a long CAS tone detect signal is the result of a true CAS being extended by speech. This may occur in talkdown situations. If the CAS tone detect signal length is greater than 105 ms (i.e., 80 ms+25 ms) less the average signal delay time, the CPE should immediately proceed to the on-hook state without the ($t_3-t_2$, or 10 ms) delay of step 1904.

§2.3 Multiple Extension Flash Capability

§2.3.1 Function and Operation

Figure 16:
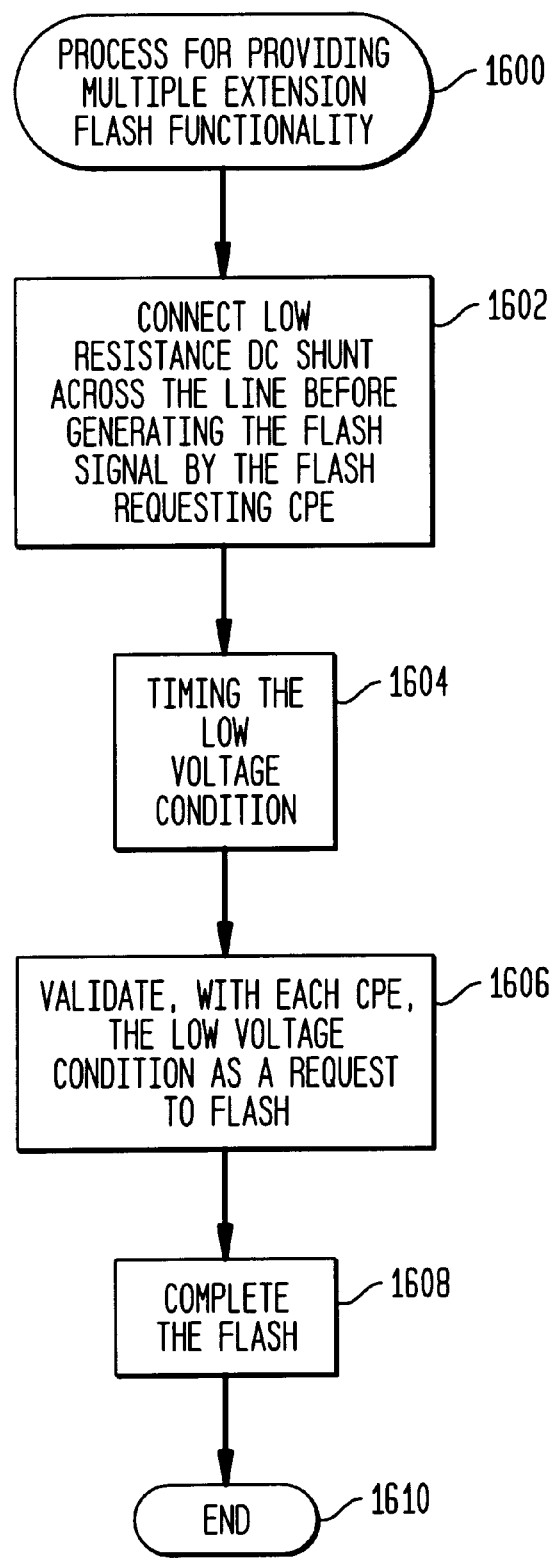
FIG. 16 is a flow diagram of a process for providing flash hook functionality when more than one piece of customer premises equipment, which share a single line, are off-hook.

FIG. 16 is a flow diagram of a process 1600 for providing flash functionality when more than one piece of customer premises equipment, which share a single line, are off-hook. To reiterate, by providing a hook-flash signal, the CPE is instructing the central office switch to take a feature specific action. As shown in step 1602, in response to a user input (e.g., a special flash key on a Type 2 CPE or the appropriate softkey on a Type 3 CPE), the flash requesting CPE first connects the low resistance DC shunt 616 across the tip and ring lines. Consequently, the line voltage will drop to well below the normal off-hook condition (e.g., less than 2V). The application of the DC shunt 616 may be in the form of a single pulse or a cadence of pulses. However, the cadence of pulses is preferred since it is more easily distinguishable from certain line faults.

The other CPEs recognize the line voltage, with their line condition monitors, as a request to flash and will time the duration of the line condition. If the line condition persists for at least a first predetermined time period (e.g., 15 ms) but no more than a second predetermined time period (e.g., 25 ms), the controllers 610 of the other CPEs will initiate a third timer which expires after a third predetermined time (e.g., 100 ms). (See steps 1604 and 1606.) After the third timer expires, each of the off-hook CPEs will synchronously go on-hook to generate a flash signal as shown in step 1608.

Preferably, to effect the flash, Type 2 CPEs will go on-hook for 1 second, while Type 3 CPEs will go on-hook for 500 ms. The Type 2 CPE should have a longer on-hook duration so that a Type 3 CPE can execute a CWD return string (which includes a flash followed by a DTMF signal for selecting an option) without signal attenuation and without having any user of a Type 2 CPE hear the return string.

If a non-CIDCW compliant CPE is off-hook, the line condition monitor 618 of the CIDCW compliant CPEs 600 will not return an on-hook state during the flash. Accordingly, the CIDCW compliant CPEs will recognize the presence of an off-hook non-CIDCW compliant CPE. In such instances, the CPE can display a message that informs the user that a non-CIDCW compliant CPE is off-hook and that the requested option cannot be performed until the non-CIDCW compliant CPE returns on-hook.

Figure 17A:
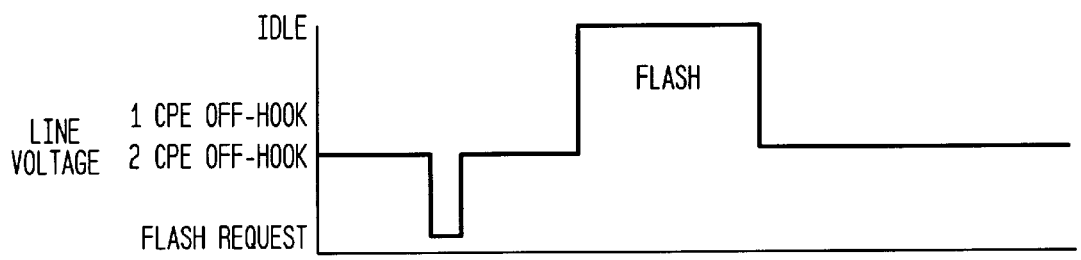
FIGS. 17A through 17C are timing diagrams which illustrate the operation of the process of FIG. 16.
Figure 17B:
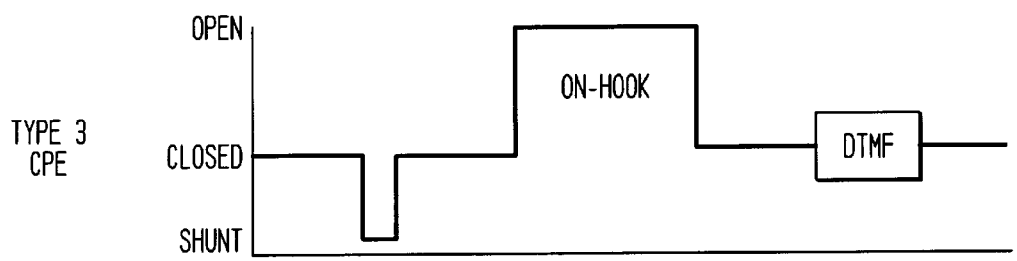
Figure 17C:
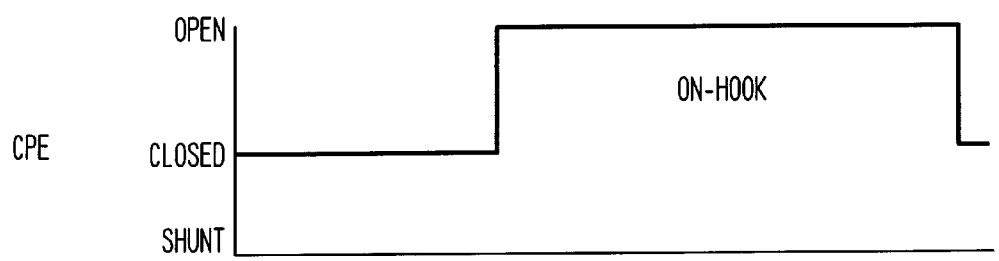

FIGS. 17A through 17C are timing diagrams which illustrate the operation of the process 1600 of FIG. 16 at a customer having an off-hook Type 3 CPE and an off-hook CIDCW compliant (e.g., Type 2 or Type 3) CPE connected to the line. FIG. 17A illustrates the line voltage over time, FIG. 17B illustrates the DC Shunt and hook states of the Type 3 CPE, which issued the flash request, and FIG. 17C illustrates the hook state of the CIDCW compliant CPE.

As shown in FIG. 17B, in response to a user selection of an appropriate softkey, the controller 610 of the Type 3 CPE 600 will connect the DC shunt 616 to the tip and ring lines, thereby causing the line voltage to drop (e.g., to less than 2V) as shown in FIG. 17A. The other CPE recognizes the change in line condition and times it. Since the changed line condition is maintained for at least the first time period (e.g., 15 ms) but less than the second time period (e.g. 25 ms), the other CPE will determine that the low voltage condition is a request to flash and sets a third timer to expire at the end of a third predetermined time period (e.g., 100 ms). As shown in FIGS. 17B and 17C, at the expiration of the third timer, both the Type 3 CPE and the other CPE go on-hook. The Type 3 CPE goes on-hook for a shorter time (e.g., 500 ms) so that it can send a DTMF signal as part of the CWD return string. The other CPE (e.g., a Type 2 CPE) goes on-hook for a longer time (e.g., 1 second).

In view of the above, the process 1600 of the present invention permits the generation of a flash hook signal even when more than one CIDCW compliant CPE is off-hook.

What is claimed is:

1. In response to an alerting signal from a source, a method for managing a data transfer from the source, via a communications link, to at least two terminals coupled with the communications link, the method comprising steps of:

a) assigning a time delay for each of the at least two terminals; and b) determining, with each of the at least two terminals, after the assigned time delay, whether the terminal will accept the data transfer from the source based on a condition of the communications link;

wherein the at least two terminals are caller identity delivery on call waiting compliant terminals, and wherein the step of assigning a delay time for each of the at least two caller identity delivery on call waiting compliant terminals includes a sub-step of storing the delay time in a memory means of the terminal.

2. The method of claim 1 wherein the data transfer from the source includes caller identity data of a waited party.

3. The method of claim 1 further comprising a step of:
muting, in each of the terminals, at least one of a transmit path and a receive path.

4. The method of claim 1 wherein the communications link carries voice data between the at least two terminals and the source, and
wherein the data transfer includes in-band data.

5. In response to an alerting signal from a source, a method for managing a data transfer from the source, via a communications link, to at least two terminals coupled with the communications link, the method comprising steps of:
a) assigning a time delay for each of the at least two terminals; and
b) determining, with each of the at least two terminals, after the assigned time delay, whether the terminal will accept the data transfer from the source based on a condition of the communications link;
wherein the at least two terminals are caller identity delivery on call waiting compliant terminals, and
wherein the step of assigning a delay time for each of the at least two caller identity delivery on call waiting compliant terminals is performed in a way selected from a group consisting of: (a)randomly, upon power-up of the terminal; (b) randomly, upon off-hook condition of the terminal; (c) randomly, upon detection of the alerting signal by the terminal; and (d) based on switch selection.

6. In response to an alerting signal from a source, a method for managing a data transfer from the source, via a communications link, to at least two terminals coupled with the communications link, the method comprising steps of:
a) assigning a time delay for each of the at least two terminals; and
b) determining, with each of the at least two terminals, after the assigned time delay, whether the terminal will accept the data transfer from the source based on a condition of the communications link;
wherein the communications link can have an on-hook condition and an off-hook condition, and
wherein the step of determining, with each of the at least two terminals, after the assigned time delay, whether the terminal will accept the data transfer from the source based on a condition of the communications link includes sub-steps of
i) going on-hook,
ii) if the communications link transitions to an on-hook condition when the terminal goes on-hook,
A) going off-hook,
B) generating an acknowledgment signal, and
C) terminating the communications link during the data transfer, and
iii) if the communications link remains in an off-hook condition when the terminal goes on-hook,
A) remaining on-hook for a predetermined time period, and
B) returning to a hook state matching its hook state before the alerting signal after the predetermined time period.

7. The method of claim 6 wherein the data transfer from the source includes caller identity data of a waited party.

8. The method of claim 6 wherein the step of determining the state of the communications link is performed by a line condition monitor of the terminal.

9. The method of claim 6 further comprising a step of:
muting, in each of the terminals, at least one of a transmit and receive path.

10. The method of claim 6 wherein the communications link carries voice data between the at least two terminals and the source,
wherein the data transfer includes in-band data,
wherein at least some of the at least two terminals are configured to interpret the data transmission, and
wherein each of the at least some of the at least two terminals configured to interpret the data transmission will process the data transmission without regard to their hook state during the data transmission.

11. The method of claim 6 further comprising, in the event of the communications link remaining in an off-hook condition, after the sub-step of remaining on-hook for a predetermined time period, the sub-step of determining whether the line condition goes on-hook, and wherein if the terminal determines that the line condition goes back on-hook, the predetermined time period corresponds to a time for the data transmission to end, and wherein if the terminal does not determine that the line condition goes back on-hook, then the predetermined time period corresponds to an acknowledgment time-out period.

12. In response to an alerting signal from a source, a method for managing a data transfer from the source, via a communications link, to at least two terminals coupled with the communications link, the method comprising steps of:
a) assigning a time delay for each of the at least two terminals; and
b) determining, with each of the at least two terminals, after the assigned time delay, whether the terminal will accept the data transfer from the source based on a condition of the communications link;
wherein each of the at least two terminals may belong to one of two different classes of terminals.

13. The method of claim 12 wherein the step of assigning a delay time for each of the at least two terminals includes sub-steps of
i) defining a first group of time delays for a first of the two different classes of terminals, wherein the first group of time delays includes a last time delay,
ii) defining a second group of time delays for a second of the two different classes of terminals, wherein the second group of time delays includes a last time delay,
iii) identifying a first one of the at least two terminals to go off-hook,
iv) if the first one of the at least two terminals to go off-hook belongs to the first of the two different classes of terminals, assigning the last time delay of the first group of time delays to the first off-hook terminal,
v) if the first one of the at least two terminals to go off-hook belongs to the second of the two different classes of terminals, assigning the last time delay of the second group of the time delays to the first off-hook terminal,
vi) if any terminals belonging to the first of the two different classes of terminals go off-hook after the first off-hook terminal, assigning such terminals to random ones of time delays, other than the last time delay, of the first group of time delays, and
vii) if any terminals belonging to the second of the two different classes of terminals go off-hook after the first off-hook terminal, assigning such terminals to random ones of time delays, other than the last time delay, of the second group of time delays.

14. The method of claim 13 wherein the data transfer from the source includes caller identity data of a waited party.

15. The method of claim 13 further comprising a step of:
muting, in each of the terminals, at least one of a transmit and receive path.

16. The method of claim 13 wherein the communications link carries voice data between the at least two terminals and the source, and
wherein the data transfer includes in-band data.

17. The method of claim 13 wherein the sub-step of identifying the first one of the at least two terminals to go off-hook is performed by a controller of the terminal based on information from at least one of a line current sensor of a peripheral to the terminal, a hook switch of the terminal, and a line condition monitor of the terminal.

18. The method of claim 13 wherein the communications link can have an on-hook condition and an off-hook condition, and
wherein the step of determining, with each of the at least two terminals, after the assigned time delay, whether the terminal will accept the data transfer from the source based on a condition of the communications link includes sub-steps of
i) going-on hook based on the assigned time delay,
ii) determining whether it is the last on-hook terminal based on the condition of the communications link,
iii) if terminal is the last on-hook terminal,
 A) going off-hook,
 B) generating an acknowledgment signal, and
 C) terminating the communications link during the data transfer, and
iv) if the terminal is not the last on-hook terminal,
 A) remaining on-hook for a predetermined time period, and
 B) returning off-hook after the predetermined time period.

19. The method of claim 18 wherein the communications link carries voice data between the at least two terminals and the source,
wherein the data transfer includes in-band data,
wherein at least some of the at least two terminals are configured to interpret the data transmission, and
wherein each of the at least some of the at least two terminals configured to interpret the data transmission will process the data transmission without regard to their hook state during the data transmission.

20. The method of claim 18 further comprising a step of:
muting, in each of the terminals, at least one of a transmit and receive path.

21. The method of claim 18 wherein the data transfer from the source includes caller identity data of a waited party.

22. The method of claim 18 wherein the second of the two classes of terminals supports more functions than the first of the two classes of terminals, and
wherein each of the time delays of the second group of time delays are larger than each of the time delays of the first group of time delays.

23. The method of claim 13 wherein the communications link can have an on-hook condition and an off-hook condition, and
wherein the step of determining, with each of the at least two terminals, after the assigned time delay, whether the terminal will accept the data transfer from the source based on a condition of the communications link includes sub-steps of
i) going on-hook,
ii) if the communications link transitions to an on-hook condition when the terminal goes on-hook,
 A) going off-hook,
 B) generating an acknowledgment signal, and
 C) terminating the communications link during the data transfer, and
iii) if the communications link remains in an off-hook condition when the terminal goes on-hook,
 A) remaining on-hook for a predetermined time period,
 B) determining whether the line condition goes on-hook, and
 C) returning to a hook state matching its hook state before the alerting signal after the predetermined time period, wherein if the terminal determines that the line condition goes back on-hook, the predetermined time period corresponds to a time for the data transmission to end, and wherein if the terminal does not determine that the line condition goes back on-hook, then the predetermined time period corresponds to an acknowledgment time-out period.

24. The method of claim 23 wherein each time delay defines a start of a time slot, and
wherein each of the time slots has a temporal length equal to that of the other time slots.

25. The method of claim 13 wherein the second of the two classes of terminals supports more functions than the first of the two classes of terminals, and
wherein each of the time delays of the second group of time delays are larger than each of the time delays of the first group of time delays.

26. The method of claim 25 wherein the data transfer from the source includes caller identity data of a waited party.

27. The method of claim 25 further comprising a step of:
muting, in each of the terminals, at least one of a transmit and receive path.

28. The method of claim 25 wherein the communications link carries voice data between the at least two terminals and the source, and
wherein the data transfer includes in-band data.

29. In response to an alerting signal from a source, a method for managing a data transfer from the source, via a communications link, to at least two terminals coupled with the communications link, the method comprising steps of:
a) assigning a time delay for each of the at least two terminals;
b) determining, with each of the at least two terminals, after the assigned time delay, whether the terminal will accept the data transfer from the source based on a condition of the communications link; and
c) determining a synchronizing reference time from which the time delay of each of the at least two terminals is measured.

30. The method of claim 29 wherein the communications link may have an on-hook condition and an off-hook condition, and
wherein the step of determining the synchronizing reference time is performed in each of the at least two terminals and includes sub-steps of
i) determining an end of the alerting signal,
ii) waiting for a first predetermined time period,
iii) going-on hook, and iv) determining the synchronizing reference time to be when the condition of the communications link transitions to the on-hook condition.

31. The method of claim 30 wherein the step of determining the synchronizing reference time includes further sub-steps of v) waiting for a second predetermined period of time, and vi) going off-hook.

32. In a telecommunications system having at least two terminals coupled with a communications link, a method for generating a flash signal on the communications link in response to a flash signal request by one of the at least two terminals, the method comprising steps of:

a) altering, with the one of the at least two terminals, a condition of the communications link to a recognizable condition distinguishable from both an on-hook condition and an off-hook condition, b) detecting, by each of the at least two terminals, the recognizable condition of the communications link, c) validating, by each of t he at least two terminals, the recognizable condition of the communications link, and d) after a first predetermined time, generating, by each of the at least two terminals, a flash signal wherein the communications link includes a tip line and a ring line, and wherein the step of altering the condition of the communications link to a recognizable condition includes a sub-step of i) coupling, by the requesting terminal, a DC shunt across the tip and ring lines of the communications link.

33. The method of claim 32 wherein the sub-step of coupling the DC shunt across the tip and ring lines of the communications link is done repeatedly to form a cadence of pulses on the communications link.

34. The method of claim 32 wherein the step of validating, by each of the at least two terminals, the recognizable condition of the line, includes a sub-step of:

i) determining whether the time of the recognizable condition of the communications link is longer than a second predetermined time and shorter than a third predetermined time.

35. In response to an alerting signal from a source, a method for managing a data transfer from the source, via a communications link, to at least two terminals coupled with the communications link, the method comprising steps of:

a) dynamically designating one of the at least two terminals as a token terminal;

b) generating an acknowledgment signal with the token terminal; and c) terminating the communications link during the data transfer with the token terminal, wherein the step of dynamically designating one of the at least two terminals as a token terminal includes sub-steps of i) assigning a delay time for each of the at least two terminals; and ii) determining, with each of the at least two terminals, after the assigned time delay, whether the terminal will accept the data transfer from the source based on a condition of the communications link wherein the communications link can have an on-hook condition and an off-hook condition, and wherein the step of determining, with each of the at least two terminals, after the assigned time delay, whether the terminal will accept the data transfer from the source based on a condition of the communications link includes sub-steps of i) going on-hook, ii) if the communications link has an on-hook condition, designating the terminal as the token terminal, and iii) if the communications link has an off-hook condition,
A) remaining on-hook for a predetermined time period, and
B) returning to a hook state matching its hook state before the alerting signal after the predetermined time period.

36. In response to an alerting signal from a source, a method for managing a data transfer from the source, via a communications link, to at least two terminals coupled with the communications link, the method comprising steps of:

a) dynamically designating one of the at least two terminals as a token terminal;

b) generating an acknowledgment signal with the token terminal; and c) terminating the communications link during the data transfer with the token terminal wherein each of the at least two terminals may belong to one of two different classes of terminals, a second of the two different classes of terminals having more functionality than a first of the two different classes of terminals, and wherein, if a terminal of the first class of terminals and a terminal of the second class of terminals are off-hook when the alerting signal is detected, the terminal of the second class of terminals will be the token terminal.

37. A device for, in response to an alerting signal from a source, managing a data transfer from the source, via a communications link, to at least two terminals coupled with the communications link, the device comprising:

a) means for assigning a time delay for each of the at least two terminals; and b) means for determining, for each of the at least two terminals, after the assigned time delay, whether the terminal will accept the data transfer from the source based on a condition of the communications link;

wherein the at least two terminals are caller identity delivery on call waiting compliant terminals, and wherein the means for assigning a time delay includes means for storing the delay time.

38. A device for, in response to an alerting signal from a source, managing a data transfer from the source, via a communications link, to at least two terminals coupled with the communications link, the device comprising:

a) means for determining whether the device is a token terminal based on a condition of the communications link;

b) means for generating an acknowledgment signal if the device is determined to be a token terminal; and c) means for terminating the communications link during the data transfer if the device is determined to be a token terminal;

wherein each of the at least two terminals may belong to one of two different classes of terminals, a second of the two different classes of terminals having more functionality than a first of the two different classes of terminals, and wherein, if a terminal of the first class of terminals and a terminal of the second class of terminals are off-hook when the alerting signal is detected, the terminal of the second class of terminals will be the token terminal.

39. The method of claim 5 wherein the data transfer from the source includes caller identity data of a waited party.

40. The method of claim 5 further comprising a step of:

muting, in each of the terminals, at least one of a transmit path and a receive path.

41. The method of claim 5 wherein the communications link carries voice data between the at least two terminals and the source, and wherein the data transfer includes in-band data.

42. A device for, in response to an alerting signal from a source, managing a data transfer from the source, via a communications link, to at least two terminals coupled with the communications link, the device comprising:

a) means for assigning a time delay for each of the at least two terminals; and b) means for determining, for each of the at least two terminals, after the assigned time delay, whether the terminal will accept the data transfer from the source based on a condition of the communications link;

wherein the at least two terminals are caller identity delivery on call waiting compliant terminals, and wherein the means for assigning a delay time performs in a way selected from a group consisting of: (a)randomly, upon power-up of the terminal; (b) randomly, upon off-hook condition of the terminal; (c) randomly, upon detection of the alerting signal by the terminal; and (d) based on switch selection.

* * * * *